United States Patent
Qiu et al.

(10) Patent No.: US 12,532,049 B1
(45) Date of Patent: Jan. 20, 2026

(54) SYSTEM AND METHOD FOR PERMISSIONS CONTROL IN LIVE-STREAMING

(71) Applicant: HYTTO PTE. LTD, Singapore (SG)

(72) Inventors: Jilin Qiu, Singapore (SG); Weirou Feng, Guangdong (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 19/218,977

(22) Filed: May 27, 2025

Related U.S. Application Data

(60) Provisional application No. 63/777,398, filed on Mar. 25, 2025.

(51) Int. Cl.
| | | |
|---|---|---|
| *H04N 21/4784* | (2011.01) | |
| *G06Q 20/06* | (2012.01) | |
| *H04L 51/046* | (2022.01) | |
| *H04N 21/2187* | (2011.01) | |
| *H04N 21/4627* | (2011.01) | |

(52) U.S. Cl.
CPC ....... *H04N 21/4784* (2013.01); *G06Q 20/065* (2013.01); *H04L 51/046* (2013.01); *H04N 21/2187* (2013.01); *H04N 21/4627* (2013.01)

(58) Field of Classification Search
CPC ........... H04N 21/4784; H04N 21/2187; H04N 21/4627; G06Q 20/065; H04L 51/046
See application file for complete search history.

(56) References Cited

U.S. PATENT DOCUMENTS

| | | | |
|---|---|---|---|
| 11,533,543 B1 * | 12/2022 | Suh | .......... H04N 21/4316 |
| 11,587,115 B2 | 2/2023 | Brown | |
| 2024/0364940 A1 * | 10/2024 | Zhang | .......... G06Q 30/06 |

FOREIGN PATENT DOCUMENTS

CN            112933596      4/2023

\* cited by examiner

*Primary Examiner* — Michael R Telan
(74) *Attorney, Agent, or Firm* — Keefe IP Law, PLLC

(57) ABSTRACT

A method is disclosed. The method includes obtaining, via a system, viewer equity data provided by at least one model terminal of a model user, wherein the viewer equity data are related to access permissions for adult entertainment information, associating, via the system, the viewer equity data with model equity data via the system, wherein the model equity data are configured to display live-streaming information on a specific audience terminal, and providing, via the system the viewer equity data via the system to the specific audience terminal, in response to the specific audience terminal accessing the live-streaming information, thereby allowing the specific audience terminal to obtain the access permissions for the adult entertainment information provided by the at least one model terminal.

20 Claims, 17 Drawing Sheets

SYSTEM AND METHOD FOR PERMISSIONS CONTROL IN LIVE-STREAMING

CROSS-REFERENCE TO RELATED APPLICATIONS

This application claims priority to U.S. provisional patent application No. 63/777,398 filed Mar. 25, 2025, the entire disclosure of which is incorporated herein by reference.

FIELD OF THE INVENTION

The present disclosure generally relates to a system and method for permissions control, and more particularly, to a system and method for permissions control in live-streaming.

BACKGROUND OF THE INVENTION

Models, such as pornographic models, often engage in live-streaming erotic videos to viewers as a safe and lucrative way to engage in erotic work. Such live-streaming typically involves tipping of models performing in a live-stream by viewers of the live-stream.

Such live-streams often involve promotion of certain models, activities, and categories of live-streaming. Conventional live-streaming platforms often rely on promotional resources of the live-streaming platform itself, with promotional resources being paid by creators of live-streaming content.

Such conventional promotion techniques are usually not applicable and/or inappropriate for the field of live-streaming of adult content. This may be particularly true for creators who seek profits from live-streaming of adult content, such as models who produce adult live-streaming content. For example, conventional promotion technology is typically limited in terms of permissions control involved with a creator's exposure to adult content users such as viewers, and the actual viewing and interest of those viewers. That is, conventional techniques do not allow for a creator of adult live-streaming content to exchange a variety of resources for exposure rights and benefits.

Accordingly, a need in the art exists for an efficient and effective technique to allow for a creator of adult live-streaming content to exchange a variety of resources for exposure rights and benefits.

The exemplary disclosed system and method are directed to overcoming one or more of the shortcomings set forth above and/or other deficiencies in existing technology.

SUMMARY OF THE INVENTION

In one exemplary aspect, the present disclosure is directed to a method. The method includes obtaining, via a system, viewer equity data provided by at least one model terminal of a model user, wherein the viewer equity data are related to access permissions for adult entertainment information, associating, via the system, the viewer equity data with model equity data via the system, wherein the model equity data are configured to display live-streaming information on a specific audience terminal, and providing, via the system, the viewer equity data via the system to the specific audience terminal, in response to the specific audience terminal accessing the live-streaming information, thereby allowing the specific audience terminal to obtain the access permissions for the adult entertainment information provided by the at least one model terminal.

In another aspect, the present disclosure is directed to a system. The system includes at least one module comprising computer-executable code stored in non-volatile memory, and a memory for storing instructions and a processor for executing the instructions. The computer-executable code, when operating on the processor, causes the system to: obtain, via a system, viewer equity data provided by at least one model terminal of a model user, wherein the viewer equity data are related to access permissions for adult entertainment information, associate, via the system, the viewer equity data with model equity data via the system, wherein the model equity data are configured to display live-streaming information on a specific audience terminal, and provide, via the system, the viewer equity data via the system to the specific audience terminal, in response to the specific audience terminal accessing the live-streaming information, thereby allowing the specific audience terminal to obtain the access permissions for the adult entertainment information provided by the at least one model terminal.

DETAILED DESCRIPTION AND INDUSTRIAL APPLICABILITY

Figure 1:
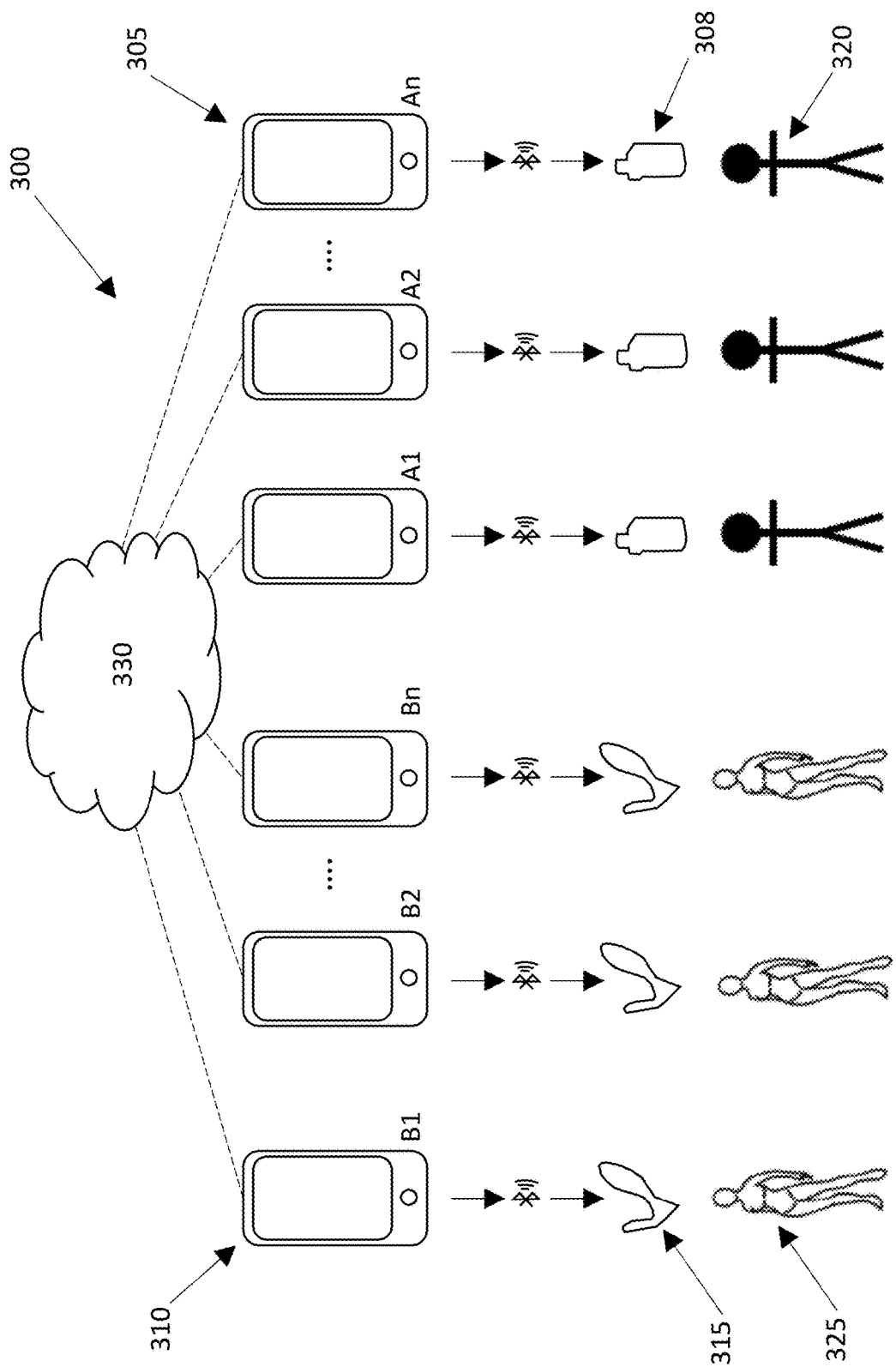
FIG. 1 is a schematic illustration of an exemplary system of the present invention.

FIG. 1 illustrates an exemplary system 300 for providing for permissions control for live-streaming content. The exemplary disclosed permissions control may be associated with a live broadcast (e.g., a live-stream) that may include for example controlling devices such as adult devices (e.g., adult toys) as part of the live broadcast. In at least some exemplary embodiments, resources of models (e.g., non-monetary resources of a model) may be exchanged with resources of a live streaming platform (e.g., exposure resources of a promotion platform) to promote models (e.g., new models) while also providing benefits for a live-streaming audience. For example, resources such as non-monetary resources of models may be used (e.g., leveraged) to benefit multiple parties, including for example models who provide live-streaming, a live-streaming audience, and a live-streaming platform.

As illustrated in FIG. 1, system 300 may include one or more male user devices 305, one or more female user devices 310, one or more male accessories 308, and one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315. These exemplary disclosed components and/or modules and/or other exemplary disclosed components described below may be included in the exemplary disclosed model terminal and/or audience terminal described below.

Returning to FIG. 1, system 300 may include any desired number of male user devices 305 (e.g., A1, A2, . . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 13 and 14). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
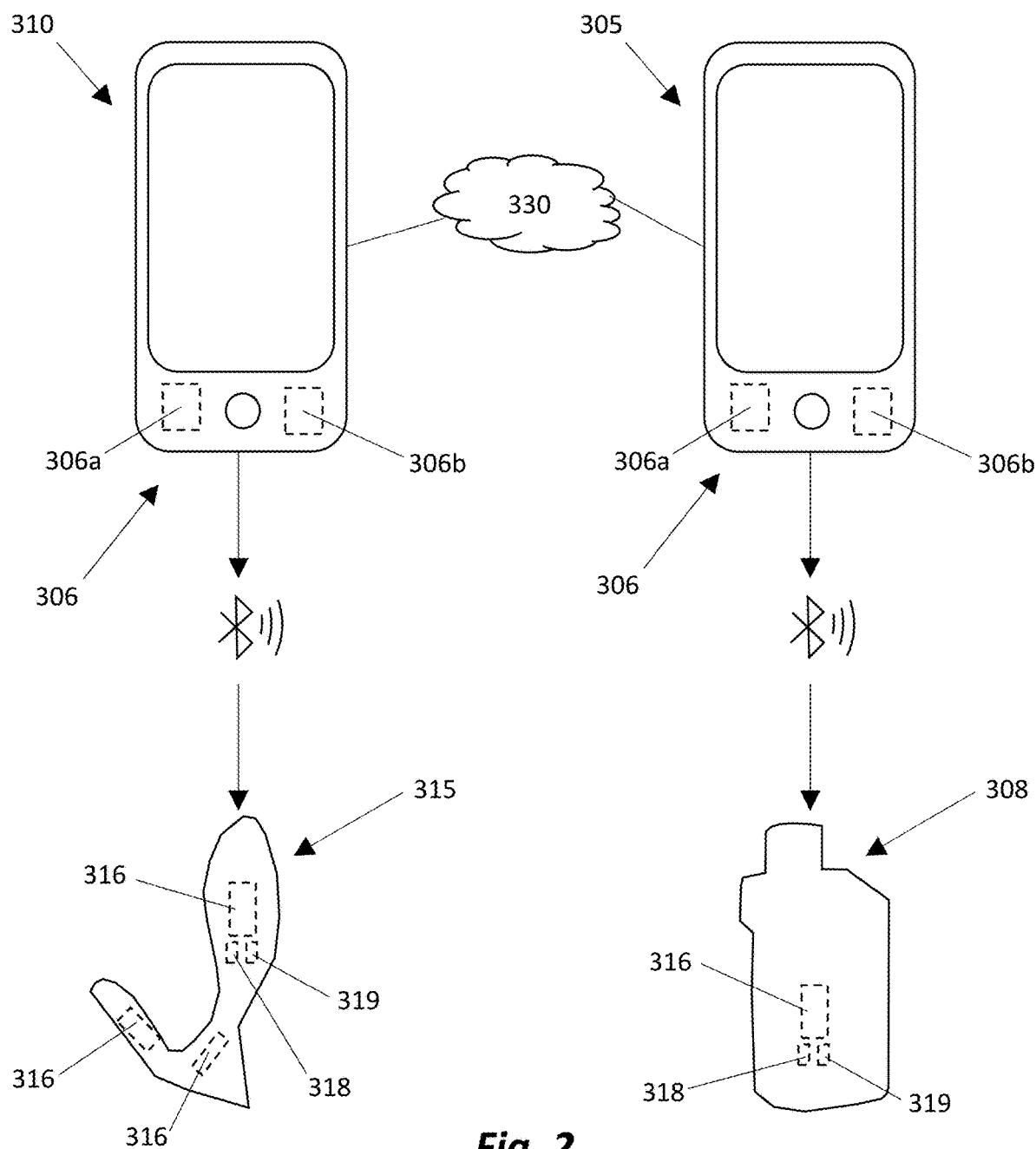
FIG. 2 is schematic illustration of exemplary accessories of the exemplary disclosed system.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor 306a and a movement sensor 306b. Location sensor 306a may include a GPS device, a Galileo device, a GLONASS device, an IRNSS device, a BeiDou device, and/or any other suitable device that may operate with a global navigation system.

Movement sensor 306b may include any suitable components for sensing motion (e.g., motion amplitude), velocity, and/or acceleration. Movement sensor 306b may include an acceleration sensor. Movement sensor 306b may include a gyroscope. For example, movement sensor 306b may include a displacement sensor, a velocity sensor, and/or an accelerometer. For example, movement sensor 306b may include components such as a servo accelerometer, a piezoelectric accelerometer, a potentiometric accelerometer, and/or a strain gauge accelerometer. Movement sensor 306b may include a piezoelectric velocity sensor or any other suitable type of velocity or acceleration sensor.

System 300 may include any desired number of female user devices 310 (e.g., B1, B2, . . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a "sex toy"). Female accessory 315 may be a sexual stimulation device that may be associated with a given female user 325 and respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 is recording a video or pictures of female user 325. For example, female user 325 may be an erotic model using female accessory 315 that may be an erotic device, a technician or laborer using female accessory 315 that may be a tool or work device specific to a desired application, and/or any other desired role using any suitable female accessory 315.

Female accessory 315 may include one or more driving components such as one or more motors 316. Motor 316 may include an electric motor. Motor 316 may include a servomotor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 13. Controller 319 may include for example a processor (e.g., micro-processing logic control device) or board components. Controller 319 may control one or more motors 316 based on input data and/or commands (e.g., control commands) received from male user device 305 and/or female user device 310 via a network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, motor 316 may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, motor 316 may include an electric heating device such as an electric resistance heating device. Motor 316 may include a polyimide heater, a silicone rubber heater, and/or a resistive wire heater. Motor 316 may be controlled by controller 319 to heat or emit heat or warmth from female accessory 315. For example, motor 316 may cause a temperature variation of female accessory 315.

Returning to FIG. 2, male accessory 308 may include components generally similar to female accessory 315 and may operate generally similarly to female accessory 315. Male accessory 308 may be a sexual stimulation device that may be associated with a given male user 320 (e.g., a viewer of one or more female users 325 and/or male users 320; or a male model) and respective male user device 305 (e.g., a viewer device) of that given male user 320.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electro-mechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 14. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via Wifi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

System 300 may include one or modules for performing the exemplary disclosed operations. The one or more modules may include an accessory control module for controlling male accessory 308 and female accessory 315. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 13 and 14. For example, the exemplary disclosed buffer storage may include components similar to the exemplary storage medium and RAM described below regarding FIG. 13. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed modules may include software modules running on model equipment. The software modules may include a smart panel (e.g., as described below), game plug-ins, and/or toy control plug-ins (e.g., for the exemplary disclosed toys) that may assist models in live broadcasting.

Figure 3:
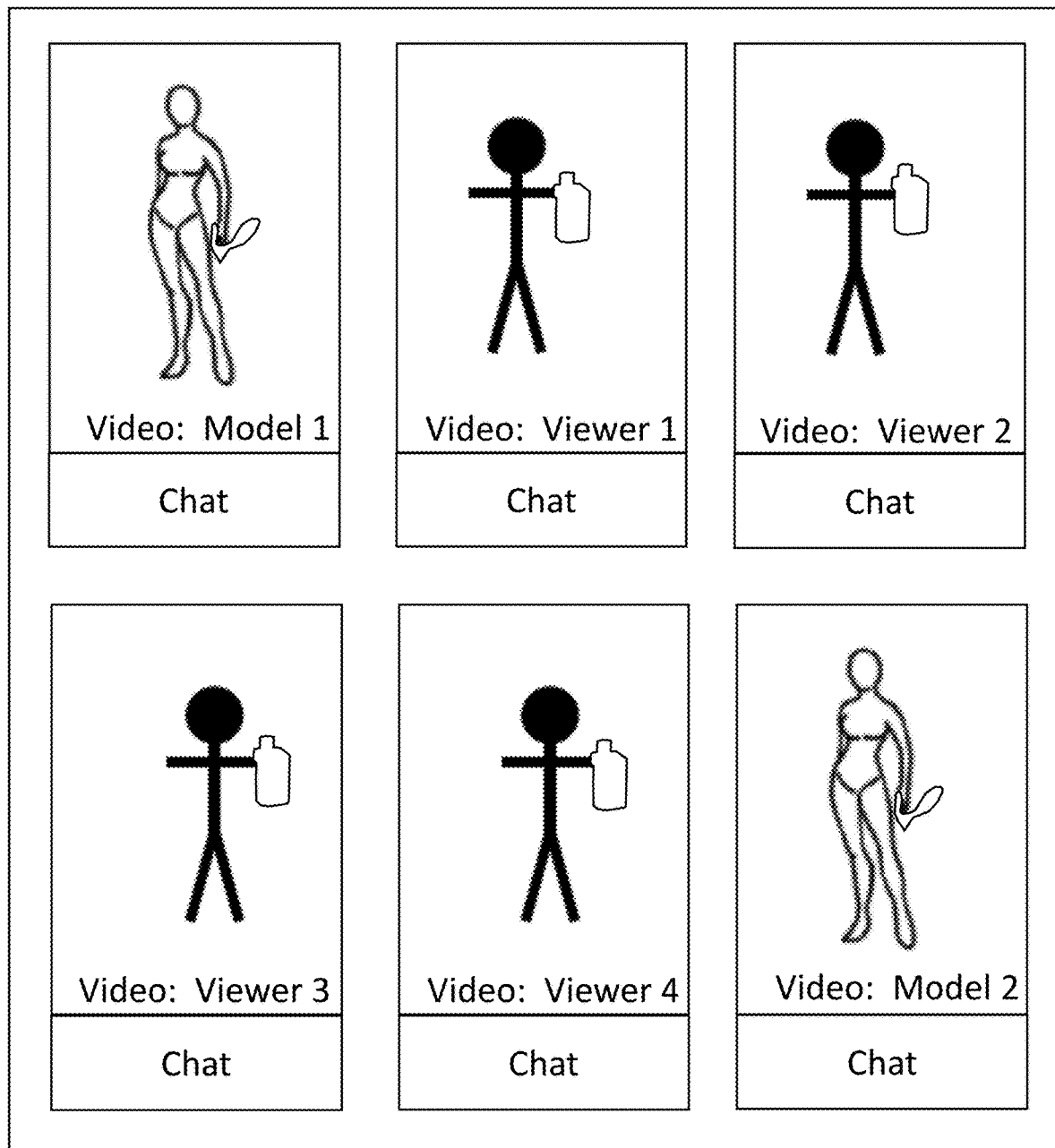
FIG. 3 is a schematic illustration of an exemplary embodiment of the exemplary disclosed system.

The one or more exemplary disclosed modules may also provide a chat room interface (e.g., and/pr a live-streaming room) via one or more male user devices 305 and/or one or more female user devices 310 for use by male users 320 and female users 325. For example, video display of female user 325, one or more male users 320, and/or and a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or models each having one or more male accessories 308) and/or a plurality of female users 325 (e.g., viewers or models each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room (e.g., a live-streaming room may be generally similar) that may be displayed to male user 320 via male user device 305 and/or to female user 325 via female user device 310.

Figure 4:
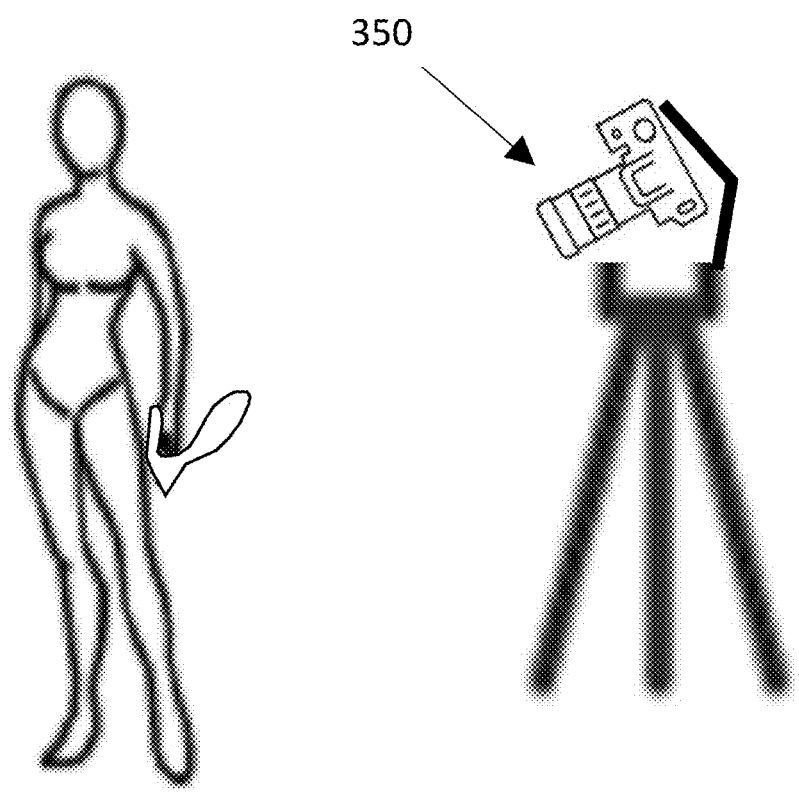
FIG. 4 is a schematic illustration of an exemplary embodiment of the exemplary disclosed system.

In at least some exemplary embodiments and as illustrated in FIG. 4, system 300 may further include an imaging device 350. Imaging device 350 may be used directly and/or indirectly to provide data to be used in an operation of system 300. For example, imaging device 350 may be a camera that may be used to obtain user input (e.g., data of gesturing images made by the user) by any suitable imaging technique (e.g., for example as described herein).

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

The exemplary disclosed model terminal and/or audience terminal disclosed herein may incorporate some, substantially all of, or components of one or more of the exemplary disclosed male user devices 305, female user devices 310, male accessories 308, female accessories 315, network 330, imaging device 350, exemplary disclosed modules, components described below regarding FIGS. 13 and/or 14, and/or any other suitable software and/or hardware components. The exemplary disclosed model terminal may be associated with the exemplary disclosed model device (e.g., female user device 310 or male user device 305), which may be used by a user such as a model or model user (e.g., female user 325 or male user 320). The exemplary disclosed audience terminal may be associated with the exemplary disclosed audience device (e.g., male user device 305 or female user device 310), which may be used by a user such as a viewer or viewer user (e.g., female user 325 or male user 320).

The exemplary disclosed system and method may be used in any suitable application for providing promotion of content during a live broadcast. For example, the exemplary disclosed system and method may be used in any suitable application for providing promotion of adult content created by a creator such as a model during live-streaming. The exemplary disclosed system and method may be used in any suitable application for allowing a creator of adult live-streaming content to exchange resources such as non-monetary resources to obtain exposure rights and/or benefits from exposure.

Figure 5:
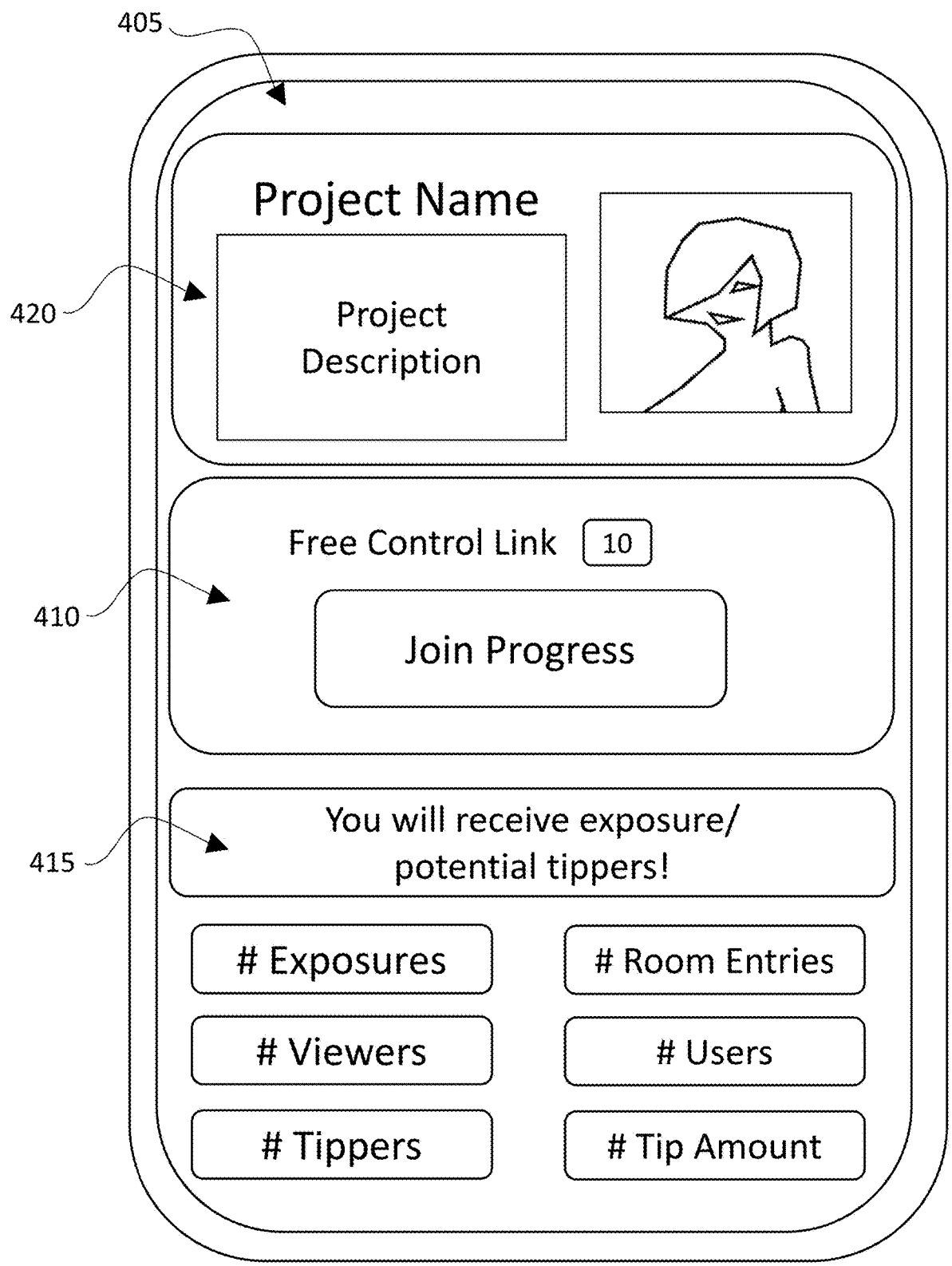
FIG. 5 is a schematic illustration of an exemplary embodiment of the exemplary disclosed system.

In at least some exemplary embodiments and for example as illustrated in FIG. 5, graphical elements provided by system 300 may be displayed on a graphical user interface such as a GUI 405 on a display or touchscreen of the exemplary disclosed user device to the user (e.g., or a spatial computing interface such as for example similar to Apple Vision Pro). Any suitable graphical element (e.g., text, graphics, GIFs, video, and/or any other suitable graphics) may be displayed on GUI 405. GUI 405 may display the exemplary disclosed live broadcast and/or data and/or elements associated with the live broadcast (e.g., input data, output data, control elements, graphical elements, information, and/or any other suitable data and/or objects) to one or more viewers and/or models (e.g., one or more female users 325 and/or male users 320) via one or more exemplary disclosed user devices (e.g., one or more female user devices 310 and/or one or more male user devices 305, and/or any other suitable device).

In at least some exemplary embodiments and as illustrated in FIG. 5, system 300 may provide a method for interaction between one or more models (e.g., male users 320 and/or female users 325) and an audience (e.g., including male users 320 and/or female users 325). The method may include obtaining, via system 300, viewer equity data (e.g., audience rights) provided by at least one exemplary disclosed model terminal. The audience rights may be associated with access permissions for live-streaming data (e.g., including adult entertainment information). For example as described herein, the audience rights may be associated with viewing a model's live-stream data (e.g., for free or at a reduced cost). For example as illustrated in FIG. 5, a graphical element such as an audience rights element 410 may depict an exemplary embodiment of audience rights such as, for example, free control links for use by an audience (e.g., one or more viewers) to view model live-stream data (e.g., view a model's live-stream for free or for a reduced cost, control a model's toy during the live-stream for free or for a reduced cost, and/or have a model control the viewer's toy for free or for a reduced cost during a live-stream). A given model may utilize a model terminal (e.g., including an exemplary user device displaying GUI 405) to configure audience rights (e.g., free control links). For example, a model may utilize (e.g., control or manipulate) audience rights element 410 to configure the exemplary disclosed audience rights.

In at least some exemplary embodiments, the audience rights may comprise access permissions for adult entertainment information that may include one or more control permissions for the exemplary disclosed model device or audience device. The control permissions may be configured to allow remote control of the model device (e.g., model user device and/or model accessory such as an adult toy as described herein) associated with the model terminal by the audience terminal, or remote control of the audience device (e.g., viewer user device and/or viewer accessory such as an adult toy as described herein) associated with the audience terminal via the model terminal. In at least some exemplary embodiments, when an audience member (e.g., viewer) accesses (e.g., clicks on) the exemplary disclosed live-streaming chat room (e.g., displaying the exemplary disclosed model equity data such as model rights), the audience member may obtain the corresponding exemplary disclosed viewer equity data (e.g., audience rights) provided by the model. This may provide an association (e.g., a convenient association) between viewer equity data (e.g., audience rights) and model equity data (e.g., model rights), thereby facilitating the audience's use of the exemplary disclosed system and reducing a learning curve (e.g., learning cost) for the audience to obtain viewer equity data.

The exemplary disclosed method may also include associating the exemplary disclosed audience rights with model equity data (e.g., model rights) via system 300. In at least some exemplary embodiments, the model rights may include the benefits of live-streaming for models (e.g., the benefits of live-stream data created by the model). The exemplary disclosed model rights may be configured to display live-streaming information (e.g., a model live-stream) on a specific audience terminal (e.g., associated with the audience rights). In at least some exemplary embodiments, the audience rights may include links to free or reduced cost content (e.g., associated with the model rights). For example as illustrated in FIG. 5, a graphical element such as a model rights element 415 may depict an exemplary embodiment of model rights such as exposure resources of system 300 for providing exposure of the model to viewers (e.g., potential tippers) of an audience of system 300 (e.g., users of system 300 who may be viewers of model live-streaming). In at least some exemplary embodiments, such exposure may introduce new users (e.g., new models) of system 300 to an audience (e.g., viewer users who may become tippers) to gain potential income (e.g., tips and payment). For example, viewers may utilize audience rights that may include free viewing of a given model, which the model may provide based on receiving model rights of exposure to viewers (e.g., possible future tippers who may pay to view and/or tip the model moving forward).

The exemplary disclosed method may also include providing the exemplary disclosed audience rights via system 300 to the exemplary disclosed audience terminal, in response to a specific audience terminal accessing the live-streaming information, thereby allowing the audience terminal to obtain the access permissions for adult entertainment information provided by the model terminal. In at least some exemplary embodiments, a viewer may use an audience terminal (e.g., including a given user device that may display a given GUI 405 displaying audience rights element 410) to obtain the access permissions (e.g., obtained by clicking audience rights element 410 that may include a free control link, which may be provided by the model using the exemplary disclosed model terminal). Similarly to the audience terminal, the model terminal may include a given user device (e.g., for example as described above regarding FIGS. 1 and 2) that may display a given GUI 405 displaying model rights element 415. For example, the model terminal may be used to set up and/or provide free control links to the audience (e.g., to the exemplary disclosed audience terminal). The free control link may allow a viewer to view a model's live-stream for free or for a reduced cost, control a model's toy during the live-stream for free or for a reduced cost, and/or have a model control the viewer's toy for free or for a reduced cost during a live-stream.

In at least some exemplary embodiments of the exemplary disclosed method, system 300 may provide a project in which models (including for example one or more female users 325 and/or male users 320) may participate. For example as illustrated in FIG. 5, a project element 420 may be any suitable graphical element for depicting graphics, information, and/or any other suitable data (e.g., video and/or animation) regarding a given project. For example, project element 420 may provide information for a program for new models (e.g., a Rising Star Support Program or any other desired project to assist models such as new models via promotion). A model may participate in the project via a model terminal and provide audience rights (e.g., a free control link as illustrated in FIG. 5). System 300 may associate the exemplary disclosed audience rights with model rights (e.g., exposure resources as illustrated in FIG. 5).

Figure 6A:
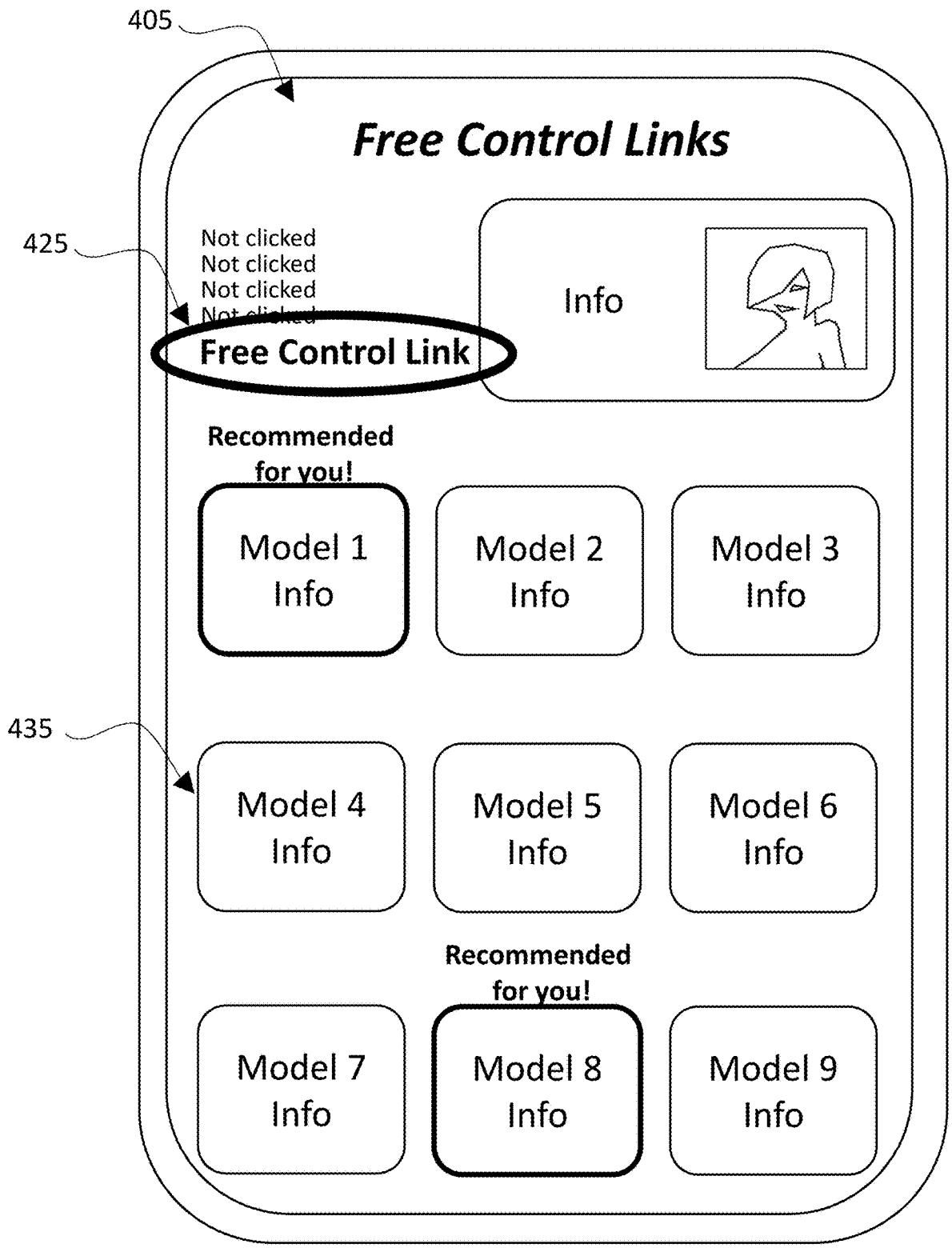
FIG. 6A is a schematic illustration of an exemplary embodiment of the exemplary disclosed system.
Figure 6B:
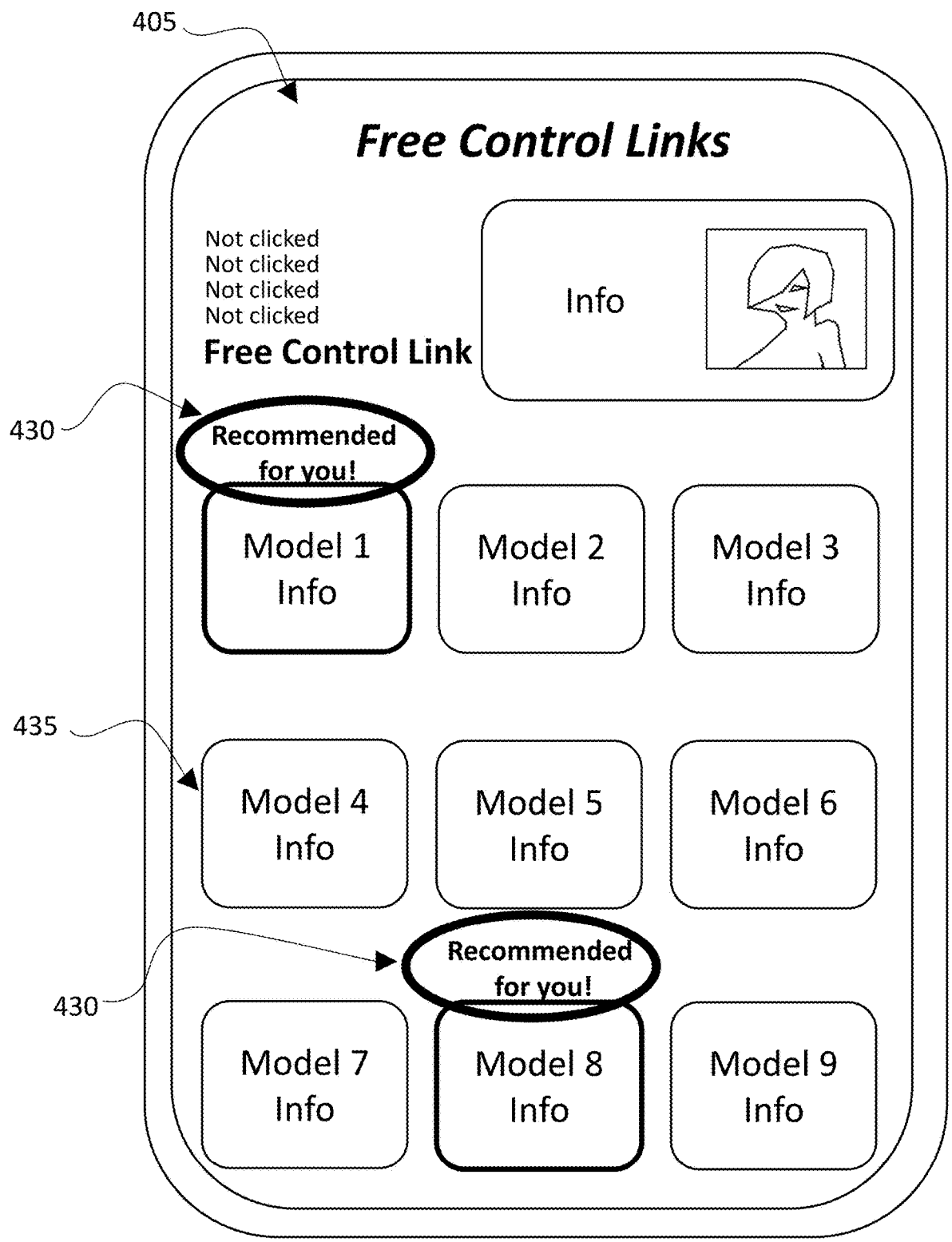
FIG. 6B is a schematic illustration of an exemplary embodiment of the exemplary disclosed system.

In at least some exemplary embodiments of the exemplary disclosed method, system 300 may be configured to display information (e.g., live-streaming information of a model) of the exemplary disclosed model rights on any suitable interface (e.g., a predefined app interface such as GUI 405) so that the live-streaming information may be browsed and accessed by an audience (e.g., users such as viewers of system 300, including for example one or more male users 320 and/or female users 325). For example as illustrated in FIGS. 6A and 6B, a viewer may use an audience terminal (e.g., including an exemplary user device displaying GUI 405) to view models offering audience rights (e.g., free control links). For example as illustrated in FIG. 6A, when a user such as a viewer manipulates (e.g., presses) a control element 425 of GUI 405, models of system 300 who are participating in the exemplary disclosed program (e.g., who have configured audience rights such as free control links) may be displayed to the viewer via the exemplary disclosed audience terminal. For example, live-streaming information of the participating models may be displayed. The live-streaming information may include one or more of the following: the model's nickname, avatar of the model, the model's personal photos, gender of the model, number of followers of the model, model's live-streaming status, or a live-streaming duration (e.g., input by the model or determined by system 300). The exemplary disclosed live-streaming information may be associated with the model's live-streaming room provided by system 300 so that an audience (e.g., viewers) may access the model's live-streaming room via the live-streaming information (e.g., via graphical elements such as model elements 435). The exemplary disclosed live-streaming information may be presented by system 300 in the form of a profile on a predefined promotional page of the model displayed by system 300 using GUI 405 and/or displayed in an advertising portion of a page (e.g., advertising slot of a page) displayed by system 300 using GUI 405 (e.g., where it can also be switchable using the audience terminal, including for example allowing a user to switch between pages displayed by GUI 405).

As illustrated in FIG. 6B, some of the participating models may be recommended to the viewer via one or more recommendation elements 430. System 300 may recommend a given model based on a predetermined algorithm and/or artificial intelligence operations based on monitoring viewer actions and preferences, input from viewers and/or models, highlighting models newly participating in a given promotion project or program, and/or any other suitable criteria.

Figure 7A:
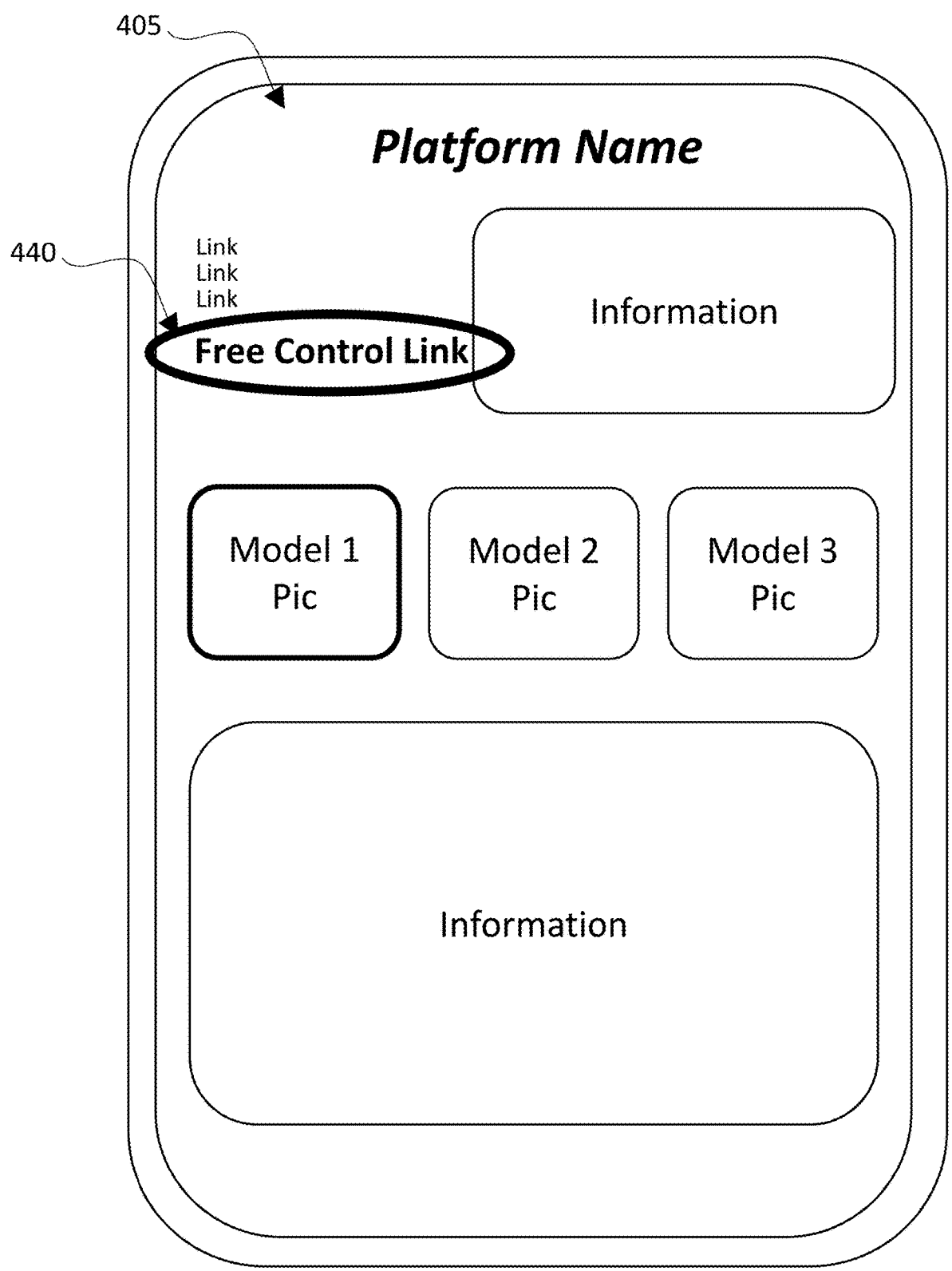
FIG. 7A is a schematic illustration of an exemplary embodiment of the exemplary disclosed system.
Figure 7B:
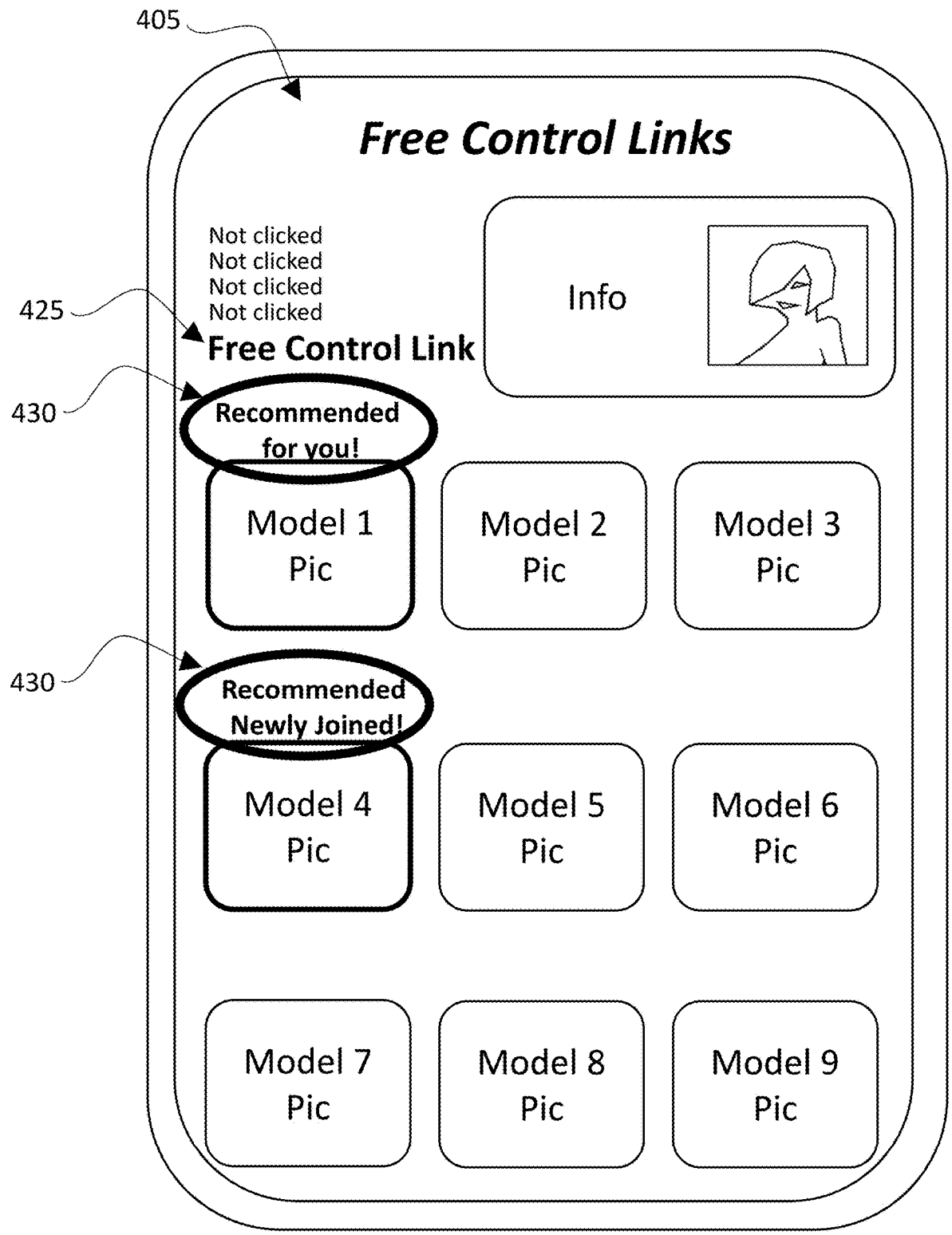
FIG. 7B is a schematic illustration of an exemplary embodiment of the exemplary disclosed system.

In at least some exemplary embodiments and as illustrated in FIGS. 7A and 7B, an audience on the audience terminal side of system 300 may browse the exemplary disclosed live-streaming information through a predefined interface provided by system 300 (e.g., via GUI 405). The predefined interface may be managed by a specific platform (e.g., a promotion platform) of system 300. The exemplary disclosed live-streaming information may be further associated with the model's live-streaming room address, allowing an audience to access the model's live-streaming room using the exemplary disclosed audience terminal (e.g., via clicking graphical elements such as links of the live-streaming information and to watch the model's live performance). For example as illustrated in FIG. 7A, a viewer may view a platform page via GUI 405 and manipulate (e.g., click on) a platform element 440 (e.g., that may be similar to control element 425), which may bring the viewer to a free control links page similar to as described above regarding FIGS. 6A and 6B.

Figure 8:
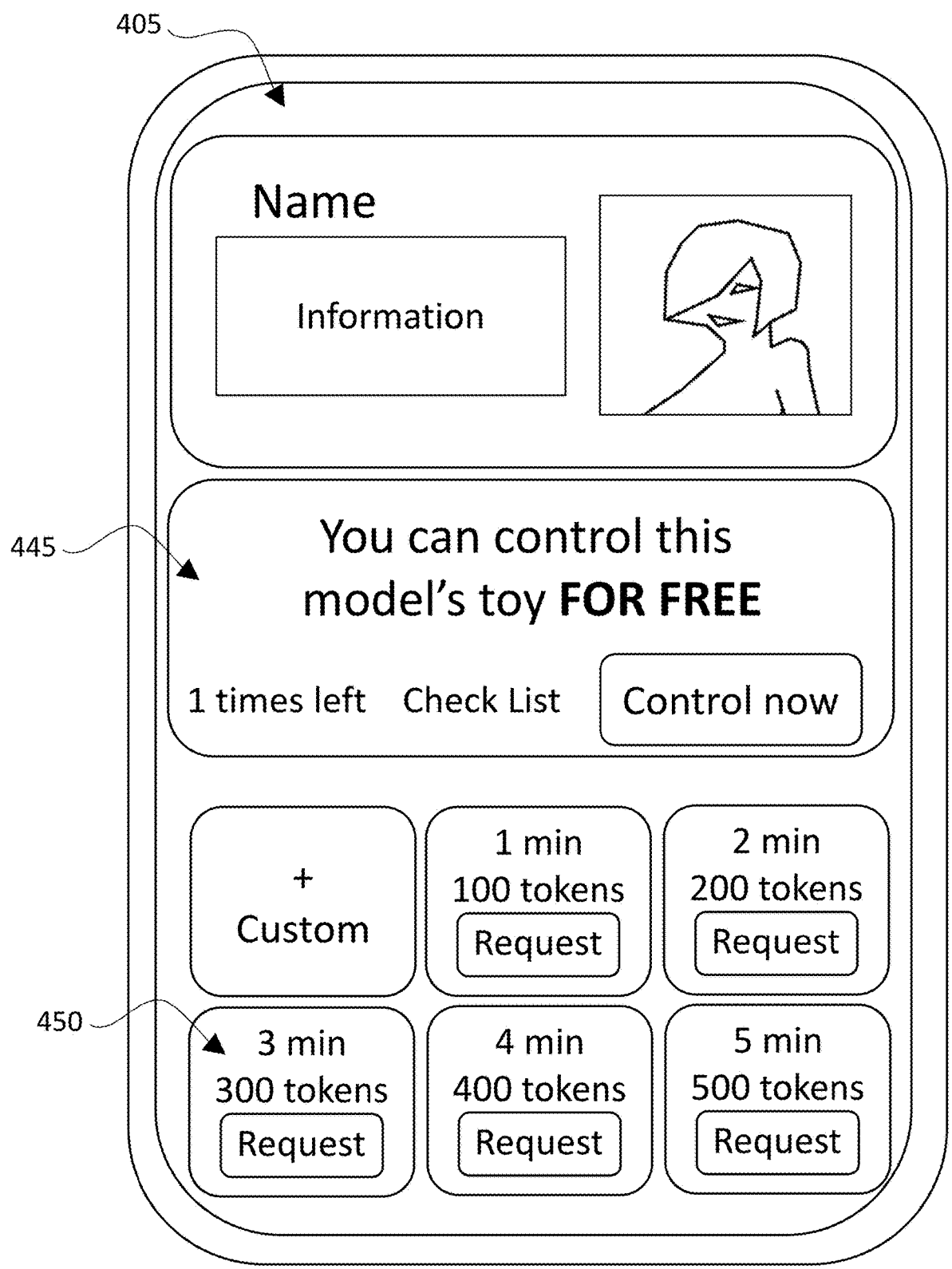
FIG. 8 is a schematic illustration of an exemplary embodiment of the exemplary disclosed system.

In at least some exemplary embodiments and as illustrated in FIG. 8, system 300 may provide the exemplary disclosed audience rights contributed by the model using the exemplary disclosed model terminal to one or more users such as viewers via one or more exemplary disclosed audience terminals. The audience including one or more viewers may utilize the exemplary disclosed audience terminal to use the audience rights. Prior to being provided to the audience terminal, the exemplary disclosed audience rights may be configured to be in a locked state (e.g., locked to the viewer). After being provided to the audience terminal, the exemplary disclosed audience rights may be configured to be in an unlocked state (e.g., unlocked to the viewer), thereby allowing the viewer to utilize the exemplary disclosed audience terminal to use the audience rights. For example as illustrated in FIG. 8, a viewer may use the exemplary disclosed audience rights by manipulating an audience rights element 445 displayed by the viewer's audience terminal. After using the audience rights (e.g., a link to view a model's live-stream for free for a predetermined duration of time such as 30 seconds, a minute, or more), the viewer may also manipulate a request element 450 to conveniently pay for additional time to further view the model's live-stream (e.g., to make a payment of tokens or payment of other value to further view the live-stream for predetermined time durations).

In at least some exemplary embodiments, system 300 may provide the exemplary disclosed audience rights to a given viewer via a given audience terminal under any of the following criteria (e.g., conditions): when the audience terminal is used to access the model's live-streaming room via the live-streaming information; when the audience terminal is associated with a user (e.g., viewer) who becomes a specific level member on a given platform (e.g., based on payment, loyalty, time of usage, and/or any other suitable criteria); when the audience terminal is used to browse the platform for a sufficient duration; when the audience terminal is used to complete a given task on the platform; and/or any other suitable criteria.

In at least some exemplary embodiments, system 300 may configure the exemplary disclosed criteria (e.g., conditions such as restriction conditions) for the audience rights. The criteria for the audience rights may be defined by system 300, including defining via the exemplary disclosed model terminal or a given promotion platform. For example, a given platform or model may define criteria (e.g., conditions), and/or system 300 may define criteria based on any suitable algorithm, artificial intelligence operations, or any other suitable basis. The criteria (e.g., conditions) may define criteria that a given audience terminal should meet to "unlock" the exemplary disclosed audience rights. The criteria (e.g., restriction conditions) may include: an attention parameter related to attention given by the specific audience terminal to a model user of the at least one model terminal (e.g., whether or not the audience terminal is used to follow the model user such as, for example, whether the viewer using the audience terminal becomes a fan of the model user); a duration parameter of the audience terminal being used to access the live-streaming information (e.g., a duration of the audience terminal being used to access the model's live-streaming room); an interaction parameter of the audience terminal accessing the live-streaming information (e.g., comment frequency of the audience terminal being used in the live-streaming room); the audience terminal being used to complete specific tasks set by models and/or platforms of system 300; and/or any other suitable criteria. The audience rights provided by the model terminal may be configured with conditions, and when the audience terminal (e.g., a specific audience terminal) satisfies the conditions, the audience terminal may be allowed to obtain access permissions for the adult entertainment information (e.g., of the audience rights) provided by the model terminal.

In at least some exemplary embodiments based on the exemplary disclosed criteria (e.g., the configured restriction conditions described above), the exemplary disclosed model terminal and/or platform may gain benefits (e.g., predetermined benefits) from the exemplary disclosed audience terminal. For example, if the model sets a condition (e.g., a restriction condition) that the audience terminal's duration parameter for accessing the live-streaming information (e.g., accessing the model's live-streaming room) is to exceed 3 minutes, then once the audience terminal's access duration surpasses 3 minutes then the audience terminal obtains the corresponding audience rights (e.g., and the model terminal is used to receive rewards such as model rights and/or other rewards proportional to the audience's access duration). For example, system 300 (e.g., the platform) sets a condition (e.g., a restriction condition) that the platform is to be shared with a new audience, then once a given audience terminal is used to share the platform with a new audience terminal, then the audience terminal may obtain the corresponding audience rights (e.g., for example providing rewards to a first viewer for sharing the platform with a second viewer).

Figure 9:
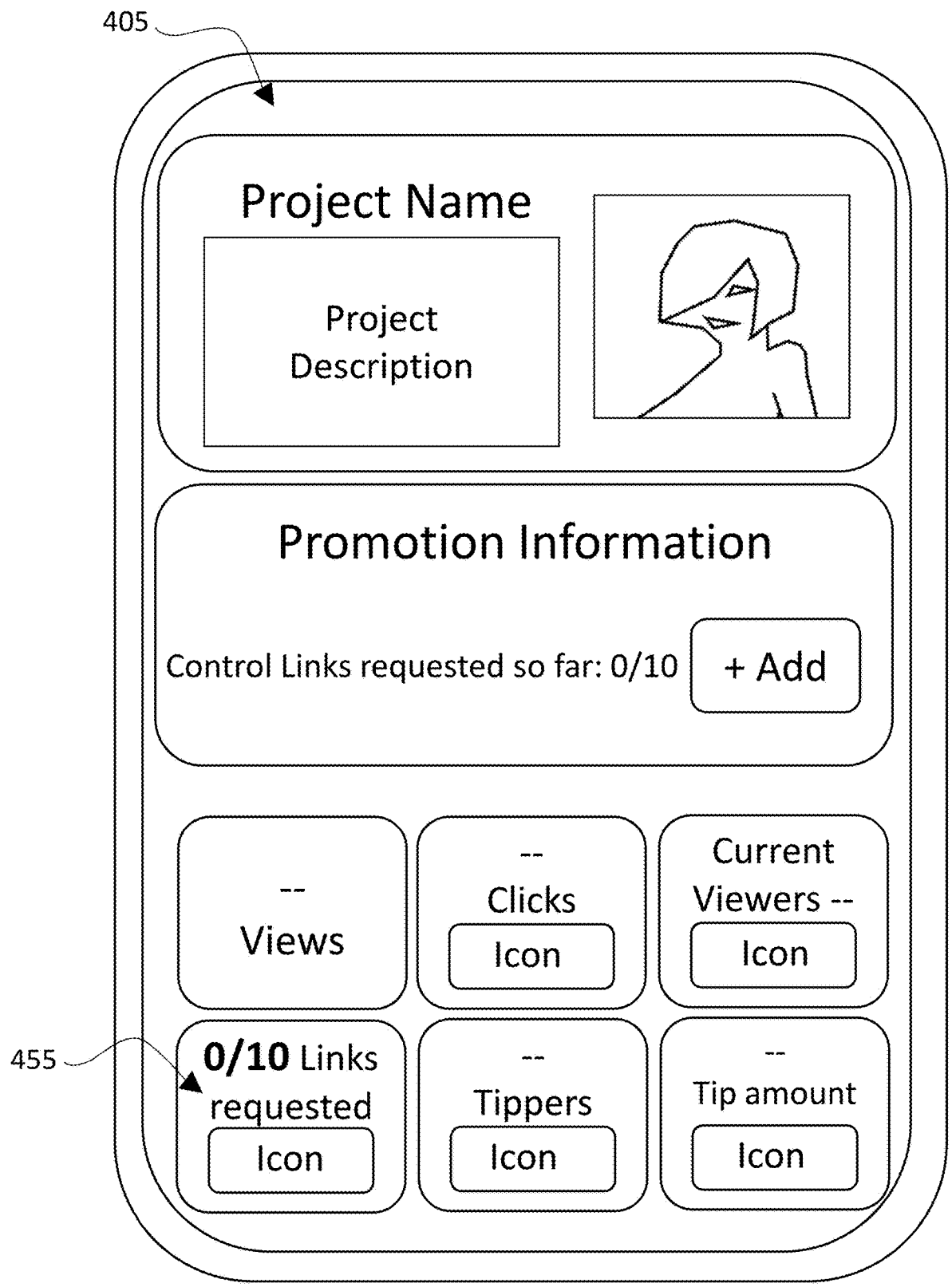
FIG. 9 is a schematic illustration of an exemplary embodiment of the exemplary disclosed system.

In at least some exemplary embodiments and as illustrated in FIG. 9, system 300 may provide for collecting access data. When a given audience terminal accesses live-streaming information for a given model or enters the model's live-streaming room page via the exemplary disclosed live-streaming information described above, system 300 may collect access data related to the audience terminal's interaction with the live-streaming information. For example as illustrated in FIG. 9, the access data may include one or more of the following metrics: a number of unique visitors, access duration, gender distribution of viewers of the audience, geographic locations of viewers of the audience, post-entry viewing duration within the live-streaming room, frequency of the viewer for using access permissions for adult entertainment information, and/or any other suitable criteria. System 300 may further display the collected access data on the model terminal's interface, enabling the model to gain real-time insights into the benefits derived from providing audience rights. For example, the access data may be depicted by access elements 455 displayed on GUI 405 of the model terminal.

In at least some exemplary embodiments, system 300 may determine an amount of real-time audience rights. The audience rights provided by a given model terminal may be set (e.g., limited) in quantity (for example, as shown in FIG. 5 at audience rights element 410, an amount of audience rights initially provided by system 300 may be 10). System 300 may operate to associate corresponding model rights (e.g., an exposure time and/or an amount of viewers to whom the model is exposed) based on a quantity of audience rights (e.g., free control links) provided by the model terminal. The exemplary disclosed associating may include balancing a quantization of the exemplary disclosed viewer equity data with a quantization of the exemplary disclosed model equity data. For example, if the quantified viewer equity data is 10 (e.g., 10 free control links provided by the model), then system 300 may provide exposure (e.g., balancing) for 10 days as model equity data to the model. Further for example, if the quantified viewer equity data is 10 (e.g., 10 free control links provided by the model), then system 300 may provide exposure (e.g., balancing) of 1,000 person-times (e.g., or any suitable unit for measuring content viewing, usage, or credit) as model equity data to the model. Additionally, system 300 may count a number of times one or more audience terminals completes the use of the audience rights (e.g., including access permissions for the adult entertainment information). For example, system 300 may collect real-time statistics on a completion count of audience terminals using (e.g., a number of times audience terminals have used) the adult entertainment information access permissions of the audience rights. System 300 may collect statistics on access data from a given audience terminal to a given model terminal (e.g., via the exemplary disclosed live-streaming information), and may cause the display of the access data on a user interface (e.g., including GUI 405) of the at least one model terminal. System 300 may display remaining audience rights in real-time on the exemplary disclosed user interface (e.g., including GUI 405) of the model terminal based on the completion count described above. For example, when a given audience terminal utilizes the access permissions, the number of audience rights available to be provided by the model terminal may decrease (e.g., decreases proportionally). System 300 may thereby adjust (e.g., decrease) a real-time display of remaining audience rights on the model terminal's user interface. If a number of audience rights provided by the model terminal falls below a predefined threshold, system 300 may suspend an allocation of model rights (e.g., associated with exposure of the model on system 300) to the model terminal.

Figure 10:
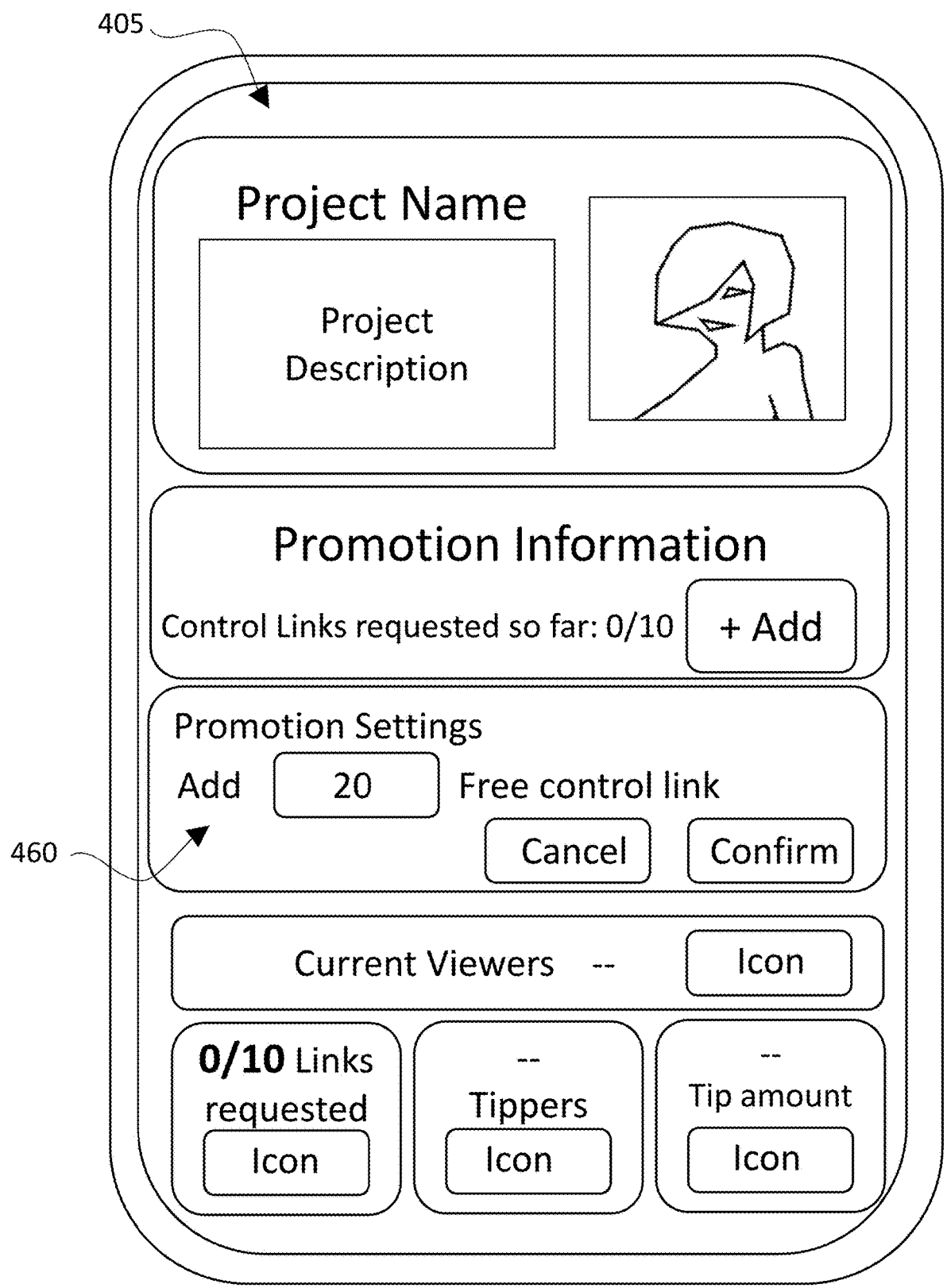
FIG. 10 is a schematic illustration of an exemplary embodiment of the exemplary disclosed system.

In at least some exemplary embodiments and as illustrated in FIG. 10, system 300 may operate to reissue audience rights. System 300 may associate reissued audience rights from at least one model terminal with model rights in response to the at least one model terminal reissuing the audience rights. For example as illustrated in FIG. 10, a given model terminal may add audience rights such as free control links (e.g., 20 free control links as illustrated at a reissue element 460, or any other desired amount). In at least some exemplary embodiments, the model terminal may reissue audience rights, while concurrently in response to the reissuance, system 300 may reassociate model rights with the newly provided audience rights. For example, system 300 may grant additional model rights in proportion to the amount of audience rights that were reissued.

In another exemplary reissue scenario, the model terminal may be used to both define a quantity of reissued audience rights and also designate specific recipients for those reissued rights. For example, the model terminal can direct the reissued audience rights to a particular audience terminal (e.g., of a particular viewer), allowing that audience terminal to obtain the given adult entertainment information access permissions. For example when the model terminal reissues the audience rights for that particular viewer, the audience terminal of that particular viewer may be prioritized (e.g., based on historical interaction data). For example, an audience terminal having interaction data that is higher than a preset threshold may be given priority and may be allocated (e.g., preferentially allocated) the reissued audience rights.

In another exemplary reissue scenario, a model terminal of a given model may reissue audience rights to audience terminals that have previously utilized the adult entertainment information access permissions in that model's live-streaming room. System 300 may send the reissued audience rights from a given model terminal to a targeted audience terminal (e.g., an audience terminal that previously obtained the audience rights) in response to the model terminal reissuing the audience rights, wherein the targeted audience terminal has completed using the audience rights for the access permissions for the adult entertainment information. For example, if an audience terminal of a first viewer (e.g., Viewer A) previously acquired the access permissions and used them in a first model's (e.g., Model A's) live-streaming room, system 300 may operate to specifically allocate those rights to Viewer A when the model terminal of Model A reissues audience rights (e.g., or alternatively may allocate rights to another user).

In at least some exemplary embodiments, system 300 may provide a display of usage information of audience rights (e.g., via GUI 405). In response to a given audience terminal using the access permissions for the adult entertainment information (e.g., of the audience rights), system 300 may push usage information of the access permissions for the adult entertainment information to other audience terminals associated with the given audience terminal. For example, system 300 may cause a display of usage information on a model live-streaming interface when a specific audience terminal uses the audience rights (e.g., including access permissions for the adult entertainment information), wherein the usage information may be configured to remind additional audience terminals that are viewing the exemplary disclosed model live-streaming interface to exercise the access permissions of the adult entertainment information. For example, when a given audience terminal utilizes the adult entertainment information access permission, it may trigger a display of usage information on the model's live-streaming interface (e.g., that may be displayed to viewers for example via GUI 405). This usage information may be displayed by system 300 to attract a viewer associated with an audience terminal that has not obtained (e.g., not yet obtained) the audience rights to gain the access permission to view the model's live-stream. For example, if the access permission is configured to access that model's private photos, when a given audience terminal (e.g., Viewer A) uses this permission to view the photos, system 300 may display a notification on the model's live-streaming interface. The notification may be, for example, "Viewer A is accessing private photos using free rights," which may be seen by other viewers. For example, these private photos may be displayed in a blurred form on the live-streaming interface to viewers who have not obtained access rights (e.g., audience rights). This blurred display may incentivize other audience members (e.g., who may know Viewer A) in the live-streaming room to acquire audience rights (e.g., thereby incentivizing them to obtain the adult entertainment information access permission).

Figure 10A:
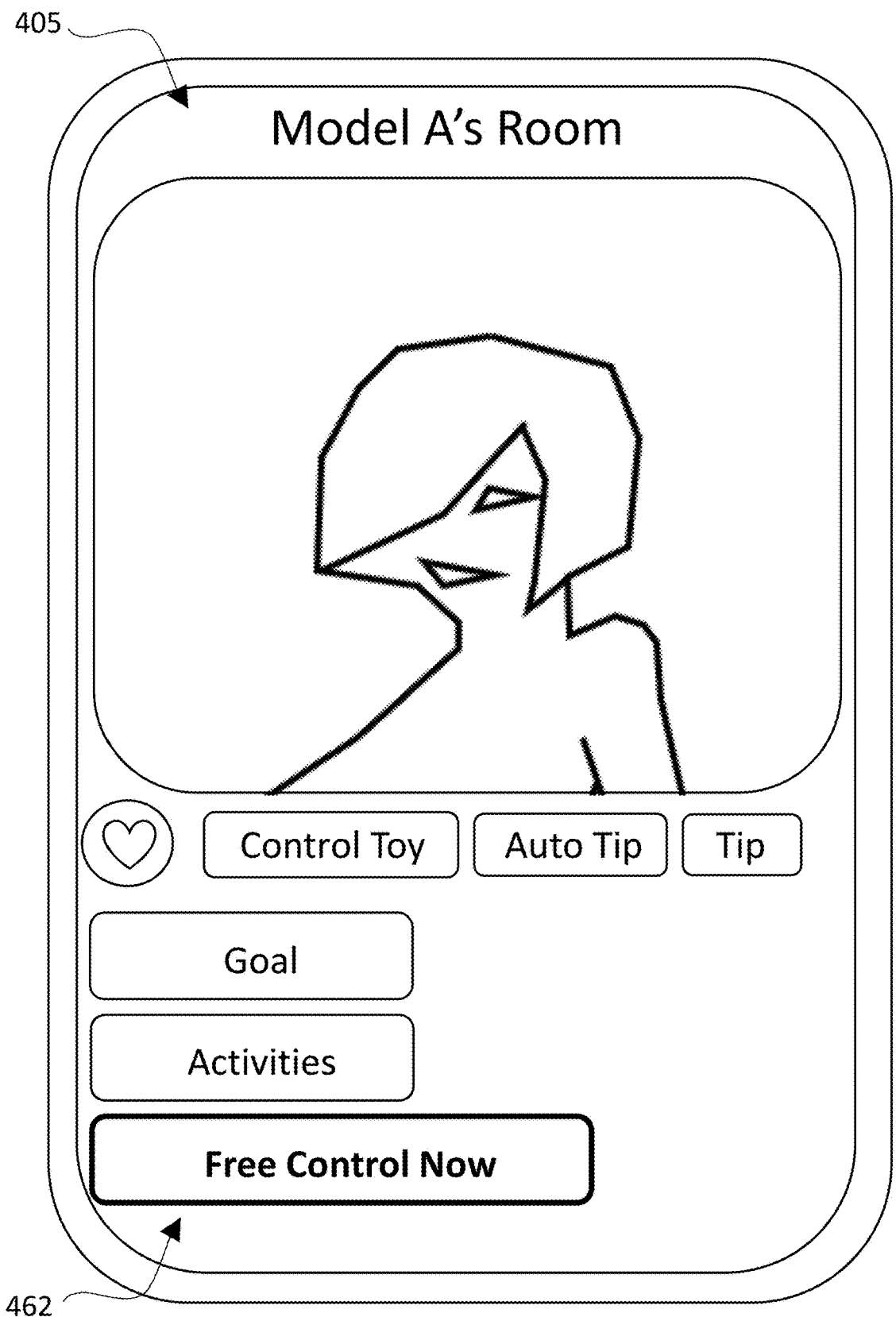
FIG. 10A is a schematic illustration of an exemplary embodiment of the exemplary disclosed system.

In at least some exemplary embodiments and as illustrated in FIG. 10A, system 300 may provide exposure information on a given model's live-streaming room page (e.g., displayed via the exemplary disclosed audience terminals), which may be displayed to viewers. For example, one or more exposure elements 462 may be displayed to viewers via GUI 405 of the exemplary disclosed audience terminals. Exposure element 462 may for example provide a display associated with the exemplary disclosed audience rights. In at least some exemplary embodiments, when a given model participates in the exemplary disclosed application (e.g., to provide audience rights), system 300 may provide (e.g., inject) relevant exposure information (e.g., exposure element 462) on the model's live-streaming room page, which may be used to expose the relevant audience rights to viewers in the live-streaming room (e.g., via GUI 405 of the exemplary disclosed audience terminals). Any suitable exposure information may be provided such as, for example, free control links, number of other viewers utilizing free control links, comments and/or positive reviews by other users regarding the model and/or use of the free control links, and/or any other suitable exposure information.

Figure 11:
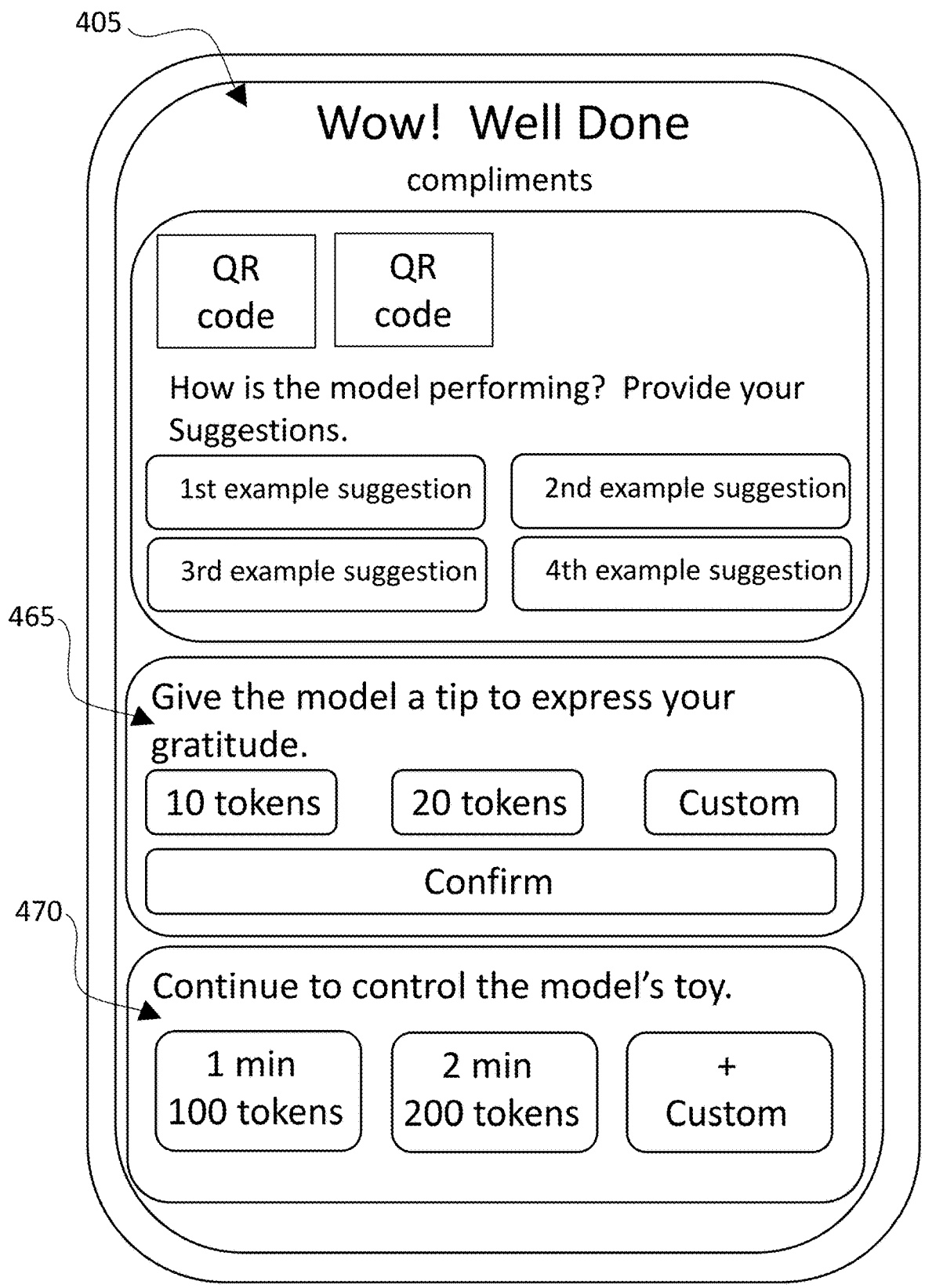
FIG. 11 is a schematic illustration of an exemplary embodiment of the exemplary disclosed system.

In at least some exemplary embodiments and as illustrated in FIG. 11, system 300 may provide (e.g., push) paid audience rights to the exemplary disclosed audience terminal. After a given audience terminal uses the access permissions for the adult entertainment information (e.g., of the audience rights), system 300 may push to the given audience terminal paid resources corresponding to the live-streaming room of a model user associated with the access permissions for the adult entertainment information. For example, after a given audience terminal utilizes the free adult entertainment information access permissions (e.g., of the exemplary disclosed audience rights), system 300 may provide (e.g., push) a paid free adult entertainment information access permission to the audience terminal. System 300 may guide a viewer via the audience terminal to pay to continue utilizing the adult entertainment information access permissions. For example, a tip element 465 may be displayed on GUI 405 by system 300 to incentivize a viewer associated with the audience terminal to provide a tip to the model associated with the audience rights that were used. Also for example, a control element 470 may be displayed on GUI 405 by system 300 to incentivize the viewer associated with the audience terminal to pay (e.g., pay tokens) to continue to view the live-stream of the model associated with the audience rights that were used.

In at least some exemplary embodiments, system 300 may perform a subscription operation to allow viewers to gain the exemplary disclosed audience rights. One or more audience terminals may perform a subscription operation to gain access to the audience rights. A subscription instruction for a model user of a given model terminal may be received from the specific audience terminal, and system 300 may associate the model rights with the audience rights obtained by a platform (e.g., a platform of system 300 and/or a third-party platform) based on the subscription instruction for the model user, wherein the model rights may be used to provide access permissions for the audience rights to one or more audience terminals. A viewer may utilize a given audience terminal to provide a model subscription instruction to system 300 (e.g., by providing payment to system 300, collecting a reward from system 300, and/or any other suitable technique for requesting or obtaining the subscription). The subscription may provide audience rights. For example, upon receiving the model subscription instruction from the audience terminal, system 300 may associate model rights of at least a given model terminal with the acquired audience rights based on the model subscription instruction. This association may allow for the associated model rights to provide for granting access of the designated audience terminal to the associated audience rights. After executing the subscription operation, the audience terminal may gain access to browse live-streaming information included in the model rights (e.g., profile data provided by system 300) as well as obtaining the audience rights contributed by the model terminal (e.g., thereby acquiring the adult entertainment information access permissions associated with the audience rights).

In at least some exemplary embodiments, the exemplary disclosed model subscription instruction may include at least one of the following information from the exemplary disclosed audience terminal: payment information (e.g., payment details), sexual preference information, regional information (e.g., geographic data), device connection information (e.g., device connection parameters), membership level (e.g., membership tier), and/or any other desired data. System 300 may associate model rights of the at least one model terminal with audience rights obtained by a platform (e.g., a platform of system 300 and/or a third-party platform) based on the subscription instruction, which may include determining the model rights of the model terminal based on the information of the subscription instruction described above. The model rights may be used by system 300 to provide the access permissions for the adult entertainment information corresponding to the information of the subscription instruction described above. The subscription may be a paid subscription or a free subscription. The subscription may be based on personalized criteria desired by a viewer such as a model's gender, geographic region, and/or sexual orientation. After system 300 receives the model subscription instruction and determines the associated audience rights, system 300 may associate the model rights of the model terminal with the acquired audience rights based on the model subscription instruction. As one example, audience terminals subscribing to models in the United States may be linked to U.S.-based model terminals. System 300 may then push audience rights provided by U.S.-based model terminals to these subscribers, allowing these users (e.g., viewers) to access live-streaming information specific to the U.S. and to obtain adult entertainment information access permissions granted by the corresponding U.S.-based model terminals.

In at least some exemplary embodiments, the exemplary disclosed audience rights provided by system 300 via the exemplary disclosed model terminal may include non-monetary resources that may be managed by the model. These resources may include the model's personal information, private photos, videos, control permissions for interactive devices (e.g., the exemplary disclosed sex toys), and/or any other suitable resources. The audience rights may be associated with access permissions for adult entertainment information that may include social media information of the model associated with the model terminal, image information of the model, video information of the model, audio information of the model, access authorization information, resource address, and/or any other desired information. The access information may include any suitable access authorization information such as, for example, an entry password for a model's private live-stream, an access password for the model's private photos (e.g., and/or GIFs or videos), an access password for any other suitable private materials associated with the model, and/or any other suitable access information. The resource address may include any suitable address or location information such as, for example, one or more URLs of private photos (e.g., and/or GIFs or videos) of the model, one or more links of the private photos (e.g., and/or GIFs or videos) of the model stored in a cloud server, and/or any other suitable location information. A given model may determine types and amounts of non-monetary resources to provide to system 300 via the exemplary disclosed model terminal (e.g., based on using the exemplary disclosed graphic elements of GUI 405 to provide or input the information). Upon receiving the audience rights via the model terminal, system 300 may quantify the non-monetary resources and associate them with corresponding model rights. The model rights may be resources (e.g., non-monetary resources) managed by the exemplary disclosed platform. The non-monetary resources of a given model may be included in audience rights to be provided to viewers as described herein. The exemplary disclosed platform of system 300 (e.g., provided via GUI 405) may provide the model rights to models (e.g., proportional to audience rights provided by the model), including for example allocating exposure-driven traffic resources to the model via the model terminal of the model. Such resources (e.g., exposure resources) of the model resources may enhance the model's visibility on the exemplary disclosed platform of system 300 and attract additional audience members (e.g., viewers) to the model's live-streaming room.

In at least some exemplary embodiments, the exemplary disclosed model rights may include non-monetary resources and/or monetary resources. For example, the exemplary disclosed model rights may be non-monetary resources such as exposure resources, and/or monetary resources, such as virtual currency or real currency. Such exposure resources may include providing links for viewers to easily find models and/or to be incentivized to view models based on free control links (e.g., view a model's live-stream for free or for a reduced cost, control a model's toy during the live-stream for free or for a reduced cost, and/or have a model control the viewer's toy for free or for a reduced cost during a live-stream). For example, when a model provides audience rights via the model terminal, the platform of system 300 may associate the audience rights with exposure resources associated with model rights provided by system 300. The amount of model rights may be provided proportionally to the amount of audience rights provided by the model. When the model rights include monetary resources, the platform of system 300 may allocate the monetary resources to the model terminal and simultaneously provide the audience rights contributed by the model via the model terminal to audience terminals that have obtained permissions as described herein.

In at least some exemplary embodiments, the exemplary disclosed audience rights may be quantified. The audience rights provided by a given model terminal may be non-monetary resources managed by a model user of the model terminal. System 300 may associate the audience rights with the model rights, which may include quantifying the non-monetary resources provided by the model terminal and associating them with corresponding model rights. The model rights may be resources managed by a third-party platform that provides the model rights. The audience rights provided by the model via the model terminal may be equivalent to time-based viewing of the model within the model's live-streaming room, which would be paid for by viewers in the absence of audience rights. The audience rights may therefore be equivalent to paid resources (e.g., the access permissions of the audience rights for adult entertainment information may be monetized). After system 300 receives audience rights from the model via the model terminal, system 300 may reconfigure the access permissions of the audience rights as free resources for designated audience terminals (e.g., that would have otherwise had a monetary value based on paid usage of system 300). Simultaneously, system 300 may allocate corresponding model resources (e.g., promotional exposure) of the model rights to the model terminal of the model who provided the audience rights, thereby facilitating an exchange between the model-provided audience rights and the platform-provided model rights.

In at least some exemplary embodiments, the platform of system 300 for receiving the audience rights and providing the model rights may be a third-party platform or a live-streaming platform. When the exemplary disclosed platform is a third-party platform, the model may provide audience rights to the third-party platform. The third-party platform may then associate these audience rights with model rights, which may grant the model exposure opportunities in pre-defined scenarios. The model's information may be promoted on the third-party platform's website, mobile application, and/or other affiliated internet platforms, thereby allocating exposure resources (e.g., model rights) to the model. If the model is live-streaming on the third-party platform, these exposure resources may attract additional audience members to the model's live-streaming room. Furthermore, audience terminals accessing the model's live-streaming room via the third-party platform may automatically obtain the audience rights, which may include access permissions to adult entertainment information associated with the model. The access permissions for the adult entertainment information (e.g., of the audience rights) may be a paid resource in a live-streaming room of a model user of a given model terminal, and when a third-party platform receives the audience rights provided by the model terminal, the access permissions for the adult entertainment information may be configured as a free resource for a given audience terminal. When the exemplary disclosed platform is a live-streaming platform, the model may provide audience rights to the live-streaming platform, and the live-streaming platform may operate to provide model rights to assist in model promotion as described herein.

In at least some exemplary embodiments, system 300 may provide free and paid audience rights. The exemplary disclosed audience rights provided by the model via the model terminal may be originally paid resources within the model's live-streaming room (e.g., the access permissions for adult entertainment information may be monetized as described above). After system 300 receives the audience rights via the model terminal, system 300 may reconfigure the access permissions as free resources for designated audience terminals as described above. Simultaneously, system 300 may allocate corresponding model resources (e.g., promotional exposure) to the model terminal, thereby facilitating an exchange between the model-provided audience rights and the platform-provided model resources as described above. When an audience terminal accesses the live-streaming information of the audience rights and subsequently uses the adult entertainment information access permissions, the access permissions may be configured as a free resource (e.g., to the viewer) within the model's live-streaming room. For example when the audience terminal obtains corresponding audience resources of the audience rights from the live-streaming information provided by the model to system 300 (e.g., by accessing the live-streaming information and entering the live-streaming room), the use of such audience resources of the audience rights may be granted as a free resource. When a given audience terminal accesses the live-streaming information and uses the access permissions for the adult entertainment information (e.g., of the audience rights), the access permissions for the adult entertainment information may be a free resource in a live-streaming room of a model user. For example, if the viewer uses the audience terminal to access the live-streaming information through the system-provided model resources of the audience rights and enters the model's live-streaming room, the viewer may automatically gain the adult entertainment information access permissions at no cost via the audience terminal. In contrast, when the audience terminal accesses the live-streaming information through a channel and uses the access permissions for the adult entertainment information, the access permissions for the adult entertainment information may be a paid resource involving payment in the live-streaming room of the model user. For example, if the viewer uses the audience terminal to access the model's live-streaming room via a channel such as a first channel (e.g., an external link or non-system pathway) and attempts to use the same access permissions, the permissions may be designated as a paid resource to the viewer within the live-streaming room. The channel may be provided from outside of system 300. In at least some exemplary embodiments, after entering a model's live-streaming room through other channels (e.g., an external link such as a regular live streaming platform's page), the viewer may also obtain the exemplary disclosed access permissions for adult entertainment information by providing payment to system 300. Alternatively for example, the exemplary disclosed access permissions for adult entertainment information may be a free resource that may be obtained by accessing the model's information via the exemplary disclosed audience terminal (e.g., viewer terminal).

Figure 12:
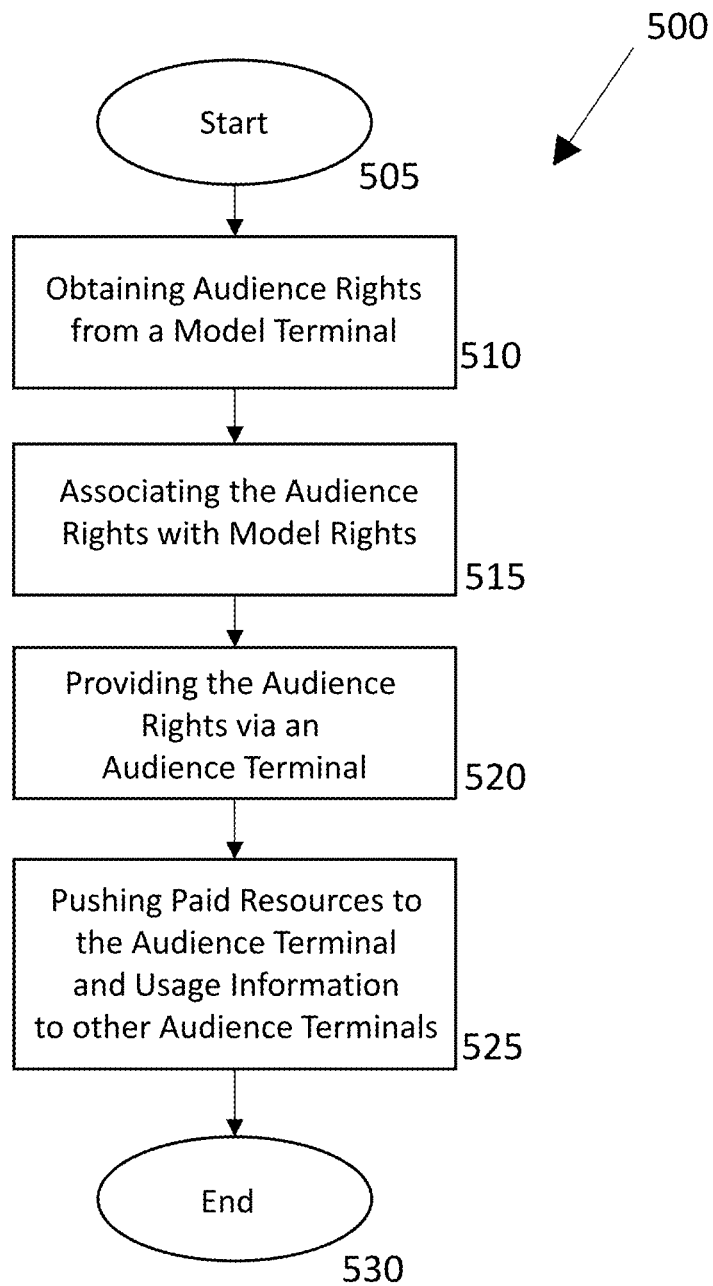
FIG. 12 is a flowchart showing an exemplary process of the present invention.

FIG. 12 illustrates an exemplary process for an operation of system 300. Process 500 begins at step 505. At step 510, system 300 may operate so that the exemplary disclosed audience rights are obtained from the exemplary disclosed model terminal, for example as described above. System 300 may obtain audience rights provided by at least one model terminal, wherein the audience rights may be related to access permissions for adult entertainment information, for example as described above. At step 515, system 300 may operate so that the exemplary disclosed audience rights and the exemplary disclosed model rights are associated, for example as described above. System 300 may associate the audience rights with model rights, wherein the model rights may be used to display live-streaming information on a specific audience terminal, for example as described above.

At step 520, system 300 may operate so that the exemplary disclosed audience rights are provided via the exemplary disclosed audience terminal, for example as described above. System 300 may provide the audience rights to the specific audience terminal, in response to the specific audience terminal accessing the live-streaming information (e.g., thereby allowing the specific audience terminal to obtain the access permissions for the adult entertainment information provided by the model terminal), for example as described above. At step 525, system 300 may operate so that paid resources are pushed to the exemplary disclosed audience terminals and usage information is pushed to other audience terminals for example as described above. Process 500 ends at step 530.

The invention includes other illustrative embodiments ("Embodiments") as follows.

Embodiment 1: A method for permissions control, comprising: obtaining, via a system, viewer equity data (e.g., audience rights) provided by at least one model terminal of a model user, wherein the viewer equity data are related to access permissions for adult entertainment information; associating, via the system, the viewer equity data with model equity data via the system, wherein the model equity data are configured to display live-streaming information on a specific audience terminal; and providing, via the system, the viewer equity data via the system to the specific audience terminal, in response to the specific audience terminal accessing the live-streaming information, thereby allowing the specific audience terminal to obtain the access permissions for the adult entertainment information provided by the at least one model terminal.

Embodiment 2: The method of Embodiment 1, wherein the associating includes balancing a quantization of the viewer equity data with a quantization of the model equity data.

Embodiment 3: The method of Embodiment 1, wherein the live-streaming information is associated with entering a live-streaming chat room where an audience remotely controls an accessory (e.g., a toy such as a sex toy) of the model user while watching a performance of the model user.

Embodiment 4: The method of Embodiment 1, wherein the access permissions for the adult entertainment information include one or more control permissions for a model device or an audience device, said control permissions configured to allow remote control of the model device associated with the at least one model terminal by the specific audience terminal, or remote control of the audience device associated with the specific audience terminal by the at least one model terminal.

Embodiment 5: The method of Embodiment 1, wherein the access permissions for the adult entertainment information include at least one selected from the group of social media information of a model user of the at least one model terminal, image information of the model user, video information of the model user, audio information of the model user, access authorization information, resource address, and combinations thereof.

Embodiment 6: The method of Embodiment 1, wherein: the viewer equity data provided by the at least one model terminal are configured with conditions; and when the specific audience terminal satisfies the conditions, the specific audience terminal is allowed to obtain the access permissions for the adult entertainment information provided by the at least one model terminal.

Embodiment 7: The method of Embodiment 6, wherein the conditions include at least one selected from the group of: an attention parameter related to attention given by the specific audience terminal to a model user of the at least one model terminal; a duration parameter related to a duration of time used by the specific audience terminal in accessing the live-streaming information; an interaction parameter related to an interaction of the specific audience terminal in accessing the live-streaming information; and combinations thereof.

Embodiment 8: The method of Embodiment 1, further comprising causing display of usage information on a model live-streaming interface when the specific audience terminal uses the access permissions for the adult entertainment information, wherein the usage information is configured to remind additional audience terminals to exercise the access permissions of the adult entertainment information.

Embodiment 9: The method of Embodiment 1, further comprising: collecting statistics on access data from the specific audience terminal to the at least one model terminal via the live-streaming information; and causing the display of the access data on a user interface of the at least one model terminal.

Embodiment 10: The method of Embodiment 1, further comprising: counting a number of times the specific audience terminal completes use of the access permissions for the adult entertainment information; displaying remaining viewer equity data in real-time on a user interface of the at least one model terminal based on the number of times; and associating reissued viewer equity data from the at least one model terminal with model equity data in response to the at least one model terminal reissuing the viewer equity data.

Embodiment 11: The method of Embodiment 10, further comprising sending the reissued viewer equity data from the at least one model terminal to a targeted audience terminal, which is the specific audience terminal or another audience terminal, in response to the at least one model terminal reissuing the viewer equity data, wherein the targeted audience terminal has previously completed using the viewer equity data for the access permissions for the adult entertainment information.

Embodiment 12: The method of Embodiment 1, wherein the viewer equity data provided by the at least one model terminal include non-monetary resources managed by a model user of the at least one model terminal; associating the viewer equity data with the model equity data via the system includes quantifying the non-monetary resources provided by the at least one model terminal and associating them with corresponding model equity data of the model equity data; and the model equity data include non-monetary resources managed by a platform that provides the model equity data.

Embodiment 13: The method of Embodiment 1, wherein: the access permissions for the adult entertainment information is a paid resource in a live-streaming room of a model user of the at least one model terminal; and when a platform receives the viewer equity data provided by the at least one model terminal, the access permissions for the adult entertainment information is configured as a free resource for the specific audience terminal.

Embodiment 14: The method of Embodiment 1, wherein: when the specific audience terminal accesses the live-streaming information and uses the access permissions for the adult entertainment information, the access permissions for the adult entertainment information is a free resource in a live-streaming room of a model user of the at least one model terminal; when the specific audience terminal accesses the live-streaming information through a channel and uses the access permissions for the adult entertainment information, the access permissions for the adult entertainment information is a paid resource involving payment in the live-streaming room of the model user; and the channel is an external link provided from outside of the system.

Embodiment 15: The method of Embodiment 11, further comprising, after the specific audience terminal uses the access permissions for the adult entertainment information, pushing to the specific audience terminal the paid resource corresponding to the live-streaming room of the model user associated with the access permissions for the adult entertainment information.

Embodiment 16: The method of Embodiment 1, further comprising, in response to the specific audience terminal using the access permissions for the adult entertainment information, pushing usage information of the access permissions for the adult entertainment information to other audience terminals associated with the specific audience terminal.

Embodiment 17: The method of Embodiment 1, further comprising: receiving a subscription instruction for a model user of the at least one model terminal from the specific audience terminal; and associating the model equity data of the at least one model terminal with the viewer equity data obtained by a platform based on the subscription instruction for the model user, wherein the model equity data are used to provide access permissions for the viewer equity data to the specific audience terminal or other audience terminals.

Embodiment 18: The method of Embodiment 17, wherein: the subscription instruction includes at least one piece of information from the specific audience terminal selected from the group of payment information, sexual preference information, regional information, device connection information, membership level, and combinations thereof; associating the model equity data of the at least one model terminal with the viewer equity data obtained by the platform based on the subscription instruction includes determining the model equity data of the at least one model terminal based on the at least one piece of information; and the model equity data are used to provide the access permissions for the adult entertainment information corresponding to the at least one piece of information.

Embodiment 19: A system, comprising: at least one module comprising computer-executable code stored in non-volatile memory; and a memory for storing instructions and a processor for executing the instructions; wherein the computer-executable code, when operating on the processor, causes the system to: obtain, via a system, viewer equity data provided by at least one model terminal of a model user, wherein the viewer equity data are related to access permissions for adult entertainment information; associate, via the system, the viewer equity data with model equity data via the system, wherein the model equity data are configured to display live-streaming information on a specific audience terminal; and provide, via the system, the viewer equity data via the system to the specific audience terminal, in response to the specific audience terminal accessing the live-streaming information, thereby allowing the specific audience terminal to obtain the access permissions for the adult entertainment information provided by the at least one model terminal.

Embodiment 20: A non-transitory computer-readable storage medium, comprising: machine-readable instructions, wherein the machine-readable instructions, when executed by a processor of a controller, cause the controller to: obtain, via a system, viewer equity data provided by at least one model terminal of a model user, wherein the viewer equity data are related to access permissions for adult entertainment information; associate, via the system, the viewer equity data with model equity data via the system, wherein the model equity data are configured to display live-streaming information on a specific audience terminal; and provide, via the system, the viewer equity data via the system to the specific audience terminal, in response to the specific audience terminal accessing the live-streaming information, thereby allowing the specific audience terminal to obtain the access permissions for the adult entertainment information provided by the at least one model terminal.

The exemplary disclosed system and method may provide an efficient and effective technique for providing promotion of adult live-streaming content. The exemplary disclosed system and method may provide an efficient and effective technique for promotion of live-streaming for creators who seek profits from live-streaming of adult content, such as models who produce adult live-streaming content. For example, the exemplary disclosed system and method may provide an efficient and effective technique allowing a creator of adult live-streaming content to exchange resources such as non-monetary resources to obtain exposure rights and benefits from exposure on a live-streaming platform.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 13:
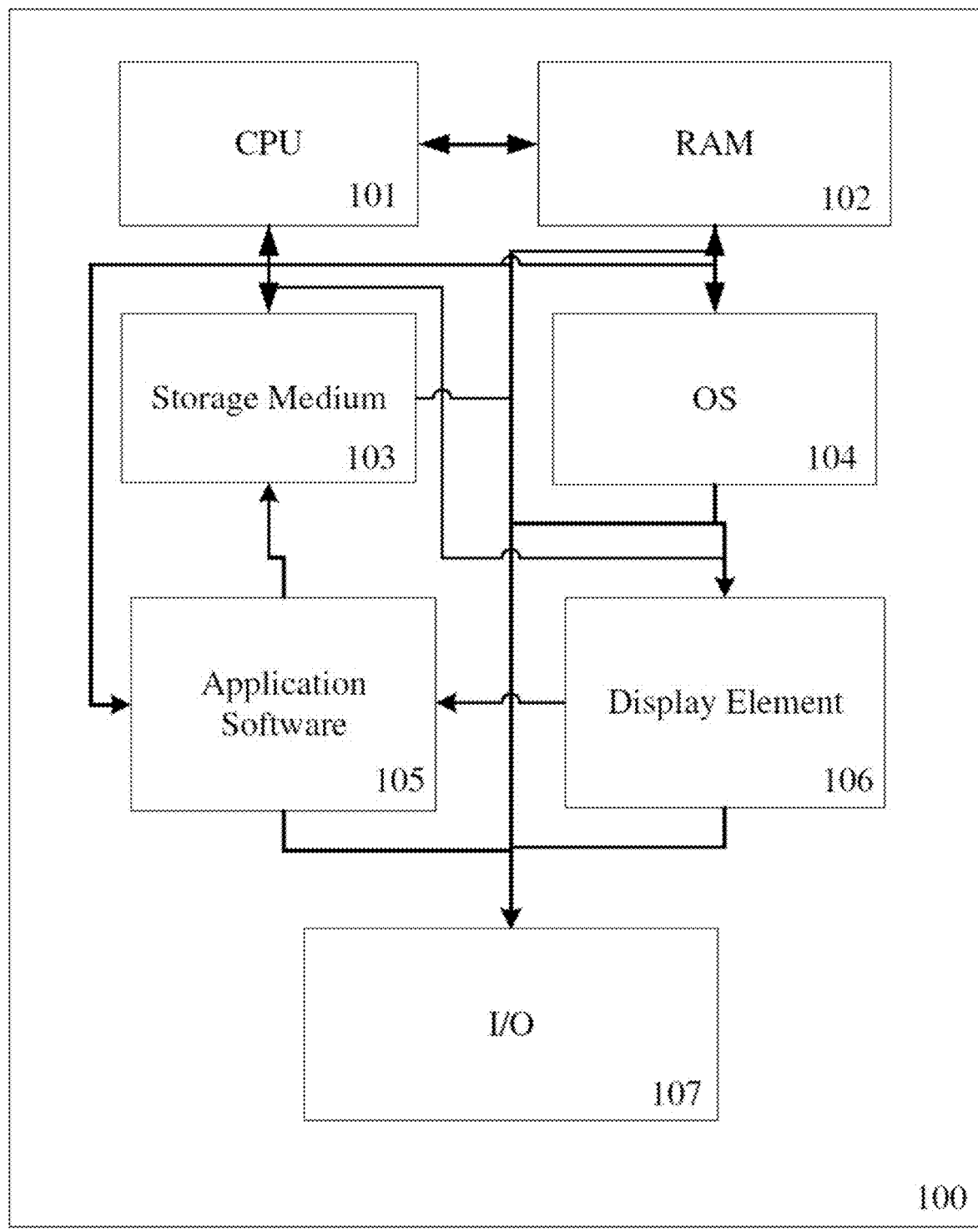
FIG. 13 is a schematic illustration of an exemplary computing device, in accordance with at least some exemplary embodiments of the present disclosure.

An illustrative representation of a computing device appropriate for use with embodiments of the system of the present disclosure is shown in FIG. 13. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 14, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 14:
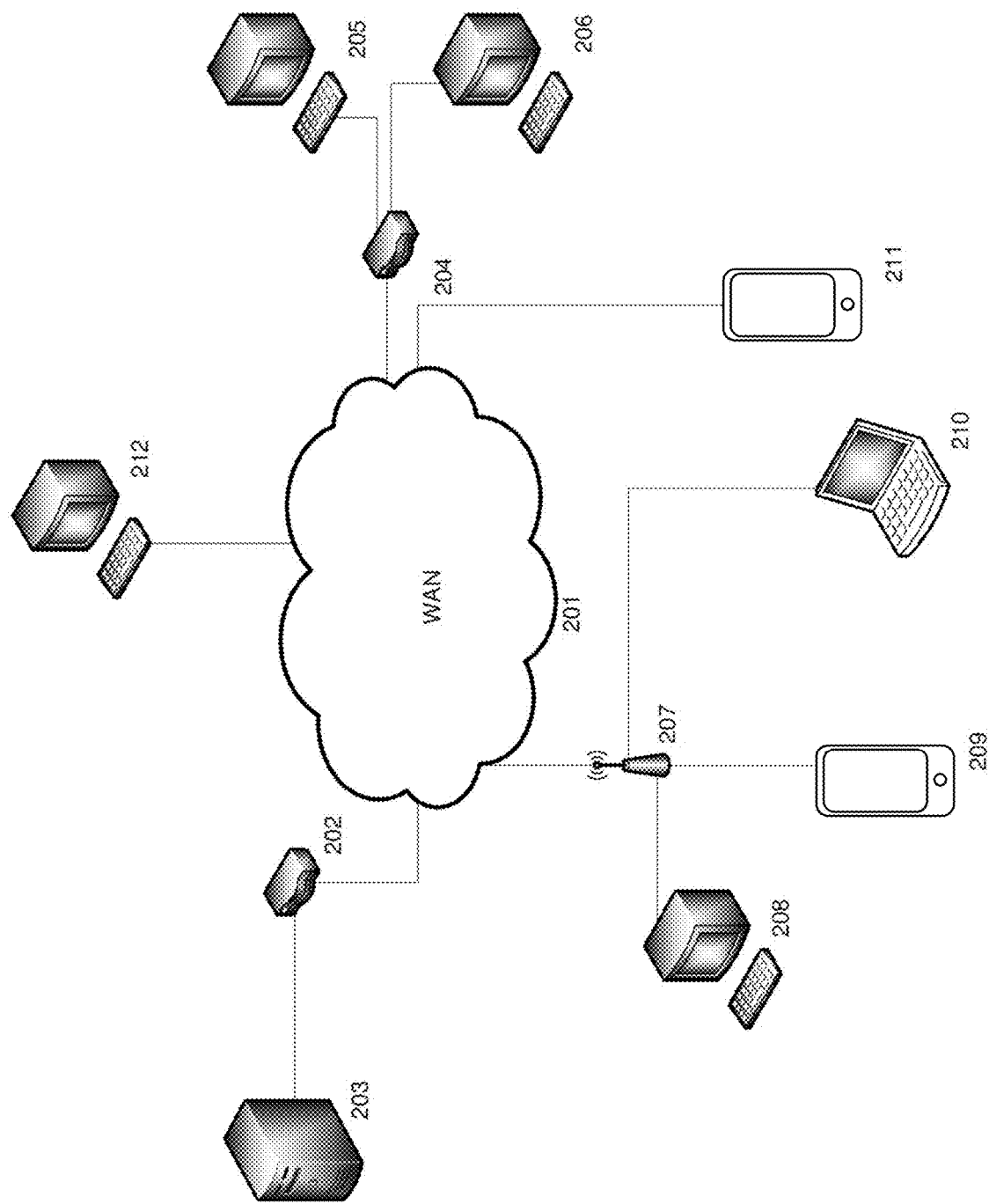
FIG. 14 is a schematic illustration of an exemplary network, in accordance with at least some exemplary embodiments of the present disclosure.

Referring to FIG. 14, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 14, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method for permissions control, comprising:
    obtaining, via a system, viewer equity data provided by at least one model terminal of a model user, wherein the viewer equity data are related to access permissions for adult entertainment information;
    associating, via the system, the viewer equity data with model equity data, wherein the model equity data are configured to display live-streaming information on a specific audience terminal;
    providing, via the system, the viewer equity data to the specific audience terminal, in response to the specific audience terminal accessing the live-streaming information, thereby allowing the specific audience terminal to obtain the access permissions for the adult entertainment information provided by the at least one model terminal;
    counting a number of times the specific audience terminal completes use of the access permissions for the adult entertainment information; and
    displaying remaining viewer equity data in real-time on a user interface of the at least one model terminal based on the number of times.

2. The method of claim 1, wherein the associating includes balancing a quantization of the viewer equity data with a quantization of the model equity data.

3. The method of claim 1, wherein the live-streaming information is associated with entering a live-streaming chat room where an audience remotely controls an accessory of the model user while watching a performance of the model user.

4. The method of claim 1, wherein the access permissions for the adult entertainment information include one or more control permissions for a model device or an audience device, said control permissions configured to allow remote control of the model device associated with the at least one model terminal by the specific audience terminal, or remote control of the audience device associated with the specific audience terminal by the at least one model terminal.

5. The method of claim 1, wherein the access permissions for the adult entertainment information include at least one selected from the group of social media information of the model user of the at least one model terminal, image information of the model user, video information of the model user, audio information of the model user, access authorization information, resource address, and combinations thereof.

6. The method of claim 1, wherein:
    the viewer equity data provided by the at least one model terminal are configured with conditions; and
    when the specific audience terminal satisfies the conditions, the specific audience terminal is allowed to obtain the access permissions for the adult entertainment information provided by the at least one model terminal.

7. The method of claim 6, wherein the conditions include at least one selected from the group of:
    an attention parameter related to attention given by the specific audience terminal to a model user of the at least one model terminal;
    a duration parameter related to a duration of time used by the specific audience terminal in accessing the live-streaming information;
    an interaction parameter related to an interaction of the specific audience terminal in accessing the live-streaming information; and
    combinations thereof.

8. The method of claim 1, further comprising causing display of usage information on a model live-streaming interface when the specific audience terminal uses the access permissions for the adult entertainment information, wherein the usage information is configured to remind additional audience terminals that are viewing the model live-streaming interface to exercise the access permissions of the adult entertainment information.

9. The method of claim 1, further comprising:
    collecting statistics on access data from the specific audience terminal to the at least one model terminal via the live-streaming information; and
    causing the display of the access data on a user interface of the at least one model terminal.

10. The method of claim 1, further comprising:
    associating reissued viewer equity data from the at least one model terminal with the model equity data in response to the at least one model terminal reissuing the viewer equity data.

11. The method of claim 10, further comprising sending the reissued viewer equity data from the at least one model terminal to a targeted audience terminal, which is the specific audience terminal or another audience terminal, in response to the at least one model terminal reissuing the viewer equity data, wherein the targeted audience terminal has previously completed using the viewer equity data for the access permissions for the adult entertainment information.

12. The method of claim 1, wherein:
    the viewer equity data provided by the at least one model terminal include non-monetary resources managed by a model user of the at least one model terminal;
    associating the viewer equity data with the model equity data via the system includes quantifying the non-monetary resources provided by the at least one model terminal and associating the non-monetary resources with corresponding model equity data of the model equity data; and the model equity data include non-monetary resources managed by a platform that provides the model equity data.

13. The method of claim 1, wherein:
the access permissions for the adult entertainment information is a paid resource in a live-streaming room of a model user of the at least one model terminal; and
when a platform receives the viewer equity data provided by the at least one model terminal, the access permissions for the adult entertainment information is configured as a free resource for the specific audience terminal.

14. The method of claim 1, wherein:
when the specific audience terminal accesses the live-streaming information and uses the access permissions for the adult entertainment information, the access permissions for the adult entertainment information is a free resource in a live-streaming room of a model user of the at least one model terminal;
when the specific audience terminal accesses the live-streaming information through a channel and uses the access permissions for the adult entertainment information, the access permissions for the adult entertainment information is a paid resource involving payment in the live-streaming room of the model user; and
the channel is an external link provided from outside of the system.

15. The method of claim 13, further comprising, after the specific audience terminal uses the access permissions for the adult entertainment information, pushing to the specific audience terminal the paid resource corresponding to the live-streaming room of the model user associated with the access permissions for the adult entertainment information.

16. The method of claim 1, further comprising, in response to the specific audience terminal using the access permissions for the adult entertainment information, pushing usage information of the access permissions for the adult entertainment information to other audience terminals associated with the specific audience terminal.

17. The method of claim 1, further comprising:
receiving a subscription instruction for a model user of the at least one model terminal from the specific audience terminal; and
associating the model equity data of the at least one model terminal with the viewer equity data obtained by a platform based on the subscription instruction for the model user, wherein the model equity data are used to provide access permissions for the viewer equity data to the specific audience terminal or other audience terminals.

18. The method of claim 17, wherein:
the subscription instruction includes at least one piece of information from the specific audience terminal selected from the group of payment information, sexual preference information, regional information, device connection information, membership level, and combinations thereof;
associating the model equity data of the at least one model terminal with the viewer equity data obtained by the platform based on the subscription instruction includes determining the model equity data of the at least one model terminal based on the at least one piece of information; and
the model equity data are used to provide the access permissions for the adult entertainment information corresponding to the at least one piece of information.

19. A system, comprising:
at least one module comprising computer-executable code stored in non-transitory computer storage; and
a memory for storing instructions and a processor for executing the instructions;
wherein the computer-executable code, when operating on the processor, causes the system to:
obtain, via a system, viewer equity data provided by at least one model terminal of a model user, wherein the viewer equity data are related to access permissions for adult entertainment information;
associate, via the system, the viewer equity data with model equity data via the system, wherein the model equity data are configured to display live-streaming information on a specific audience terminal;
provide, via the system, the viewer equity data via the system to the specific audience terminal, in response to the specific audience terminal audience terminal to obtain the access permissions for the adult entertainment information provided by the at least one model terminal-;
count, via the system, a number of times the specific audience terminal completes use of the access permissions for the adult entertainment information; and
display, via the system, remaining viewer equity data in real-time on a user interface of the at least one model terminal based on the number of times.

20. A non-transitory computer-readable storage medium, comprising:
machine-readable instructions, wherein the machine-readable instructions, when executed by a processor of a controller, cause the controller to:
obtain, via a system, viewer equity data provided by at least one model terminal of a model user, wherein the viewer equity data are related to access permissions for adult entertainment information;
associate, via the system, the viewer equity data with model equity data via the system, wherein the model equity data are configured to display live-streaming information on a specific audience terminal;
provide, via the system, the viewer equity data via the system to the specific audience terminal, in response to the specific audience terminal audience terminal to obtain the access permissions for the adult entertainment information provided by the at least one model terminal-;
count, via the system, a number of times the specific audience terminal completes use of the access permissions for the adult entertainment information; and
display, via the system, remaining viewer equity data in real-time on a user interface of the at least one model terminal based on the number of times.

* * * * *